United States Patent
Kim et al.

(10) Patent No.: US 7,499,417 B2
(45) Date of Patent: Mar. 3, 2009

(54) APPARATUS AND METHOD FOR CONTROLLING AN OUTPUT BUFFER IN A HYBRID AUTOMATIC REPEAT REQUEST (HARQ) MOBILE COMMUNICATION SYSTEM

(75) Inventors: Min-Goo Kim, Suwon-si (KR);
Sang-Hyuck Ha, Suwon-si (KR);
Jin-Woo Heo, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 788 days.

(21) Appl. No.: 10/752,101

(22) Filed: Jan. 7, 2004

(65) Prior Publication Data
US 2004/0190552 A1    Sep. 30, 2004

(30) Foreign Application Priority Data
Jan. 7, 2003    (KR)    .............. 10-2003-0000894

(51) Int. Cl.
*H04B 7/00*    (2006.01)
(52) U.S. Cl. ............... 370/310; 370/469; 375/136; 714/749; 714/795
(58) Field of Classification Search .......... 370/469, 370/218, 394, 310, 335; 375/340, 136, 262, 375/341; 714/746, 748, 749, 795
See application file for complete search history.

(56) References Cited

U.S. PATENT DOCUMENTS 4,680,700 A * 7/1987 Hester et al. ............... 711/206

(Continued)

FOREIGN PATENT DOCUMENTS

KR    0012100    2/2002

(Continued)

OTHER PUBLICATIONS

Xiao-Jun Zeng; Zhi-Liang Hong, "Design and implementation of a turbo decoder for 3G W-CDMA systems ," Consumer Electronics, IEEE Transactions on , vol. 48, No. 2, pp. 284-291, May 2002.*

*Primary Examiner*—Hassan Kizou
*Assistant Examiner*—Jeffrey M Rutkowski
(74) *Attorney, Agent, or Firm*—Roylance, Abrams, Berdo & Goodman, LLP

(57) ABSTRACT

A mobile station apparatus and method provide for receiving packet data transmitted over a packet data channel, decoding the received packet data and delivering the decoded packet data to an upper layer in a mobile communication system transmitting packet data transmitted over a forward packet data channel and transmitting, over a forward packet data control channel, demodulation and decoding information of packet data transmitted over the forward packet data channel. The apparatus and method comprise a fast turbo decoder for decoding packet data received over the packet data channel depending on information received over the forward packet data control channel, storing the decoded data, and outputting buffer information of the stored data; an output buffer for storing the received packet data, and outputting the packet data upon receiving a read request. The apparatus and method further comprise an output buffer controller for receiving information on the decoded data and the buffer information from the fast turbo decoder, and generating an interrupt signal and a read address for reading data stored in the output buffer using the received data information and buffer information; and a processor for reading data stored in the output buffer according to the read address upon receiving the interrupt signal from the output buffer controller.

25 Claims, 22 Drawing Sheets

U.S. PATENT DOCUMENTS

| | | | | |
|---|---|---|---|---|
| 5,265,215 A * | 11/1993 | Fukuda et al. | ............... | 710/123 |
| 5,455,820 A * | 10/1995 | Yamada | ................ | 370/395.71 |
| 5,898,828 A * | 4/1999 | Pignolet et al. | ................ | 714/6 |
| 6,272,153 B1 * | 8/2001 | Huang et al. | ................ | 370/503 |
| 6,594,286 B2 * | 7/2003 | Chen et al. | ................. | 370/529 |
| 6,615,332 B2 * | 9/2003 | Yamamoto et al. | .......... | 711/167 |
| 6,894,994 B1 * | 5/2005 | Grob et al. | ................. | 370/335 |
| 6,977,888 B1 * | 12/2005 | Frenger et al. | .............. | 370/218 |
| 6,987,780 B2 * | 1/2006 | Wei et al. | ................... | 370/469 |
| 7,159,030 B1 * | 1/2007 | Elzur | ........................ | 709/238 |
| 7,173,919 B1 * | 2/2007 | Dabak | ........................ | 370/335 |
| 7,206,332 B2 * | 4/2007 | Kwan et al. | ................. | 375/140 |
| 7,225,384 B2 * | 5/2007 | Heo et al. | ................... | 714/749 |
| 2002/0015401 A1 * | 2/2002 | Subramanian et al. | ...... | 370/347 |
| 2002/0021698 A1 * | 2/2002 | Lee et al. | ..................... | 370/394 |
| 2002/0122423 A1 | 9/2002 | Mukhopadhyay et al. | | |
| 2003/0118031 A1 * | 6/2003 | Classon et al. | ......... | 370/395.54 |
| 2004/0052266 A1 * | 3/2004 | Meyer et al. | ................ | 370/412 |
| 2005/0022098 A1 * | 1/2005 | Vayanos et al. | ............. | 714/776 |
| 2006/0050666 A1 * | 3/2006 | Odenwalder | ................ | 370/335 |
| 2008/0002629 A1 * | 1/2008 | Roh et al. | ................... | 370/335 |
| 2008/0107053 A1 * | 5/2008 | Kim et al. | ................... | 370/310 |

FOREIGN PATENT DOCUMENTS

| | | |
|---|---|---|
| KR | 0012102 | 2/2002 |
| KR | 0048498 | 6/2002 |
| KR | 0037565 | 9/2002 |
| WO | WO 02/060214 A1 | 8/2002 |

* cited by examiner

APPARATUS AND METHOD FOR CONTROLLING AN OUTPUT BUFFER IN A HYBRID AUTOMATIC REPEAT REQUEST (HARQ) MOBILE COMMUNICATION SYSTEM

PRIORITY

This application claims priority under 350 U.S.C. § 119 to an application entitled "Apparatus and Method for Controlling Output Buffer in a HARQ Mobile Communication System" filed in the Korean Intellectual Property Office on Jan. 7, 2003 and assigned Serial No. 2003-894, the contents of which are incorporated herein by reference.

BACKGROUND OF THE INVENTION

1. Field of the Invention

The present invention relates generally to an apparatus and method for controlling a buffer in a mobile communication system, and in particular, to an apparatus and method for controlling a buffer in a mobile communication system using a Hybrid Automatic Repeat Request (hereinafter referred to as "HARQ") scheme.

2. Description of the Related Art

Mobile communication systems have been developed to provide a high-quality call service to moving users. With the development of mobile communication systems, research is being conducted on a method for transmitting increasing amounts of data to users. In addition, mobile communication systems have already been switched from an analog system to a digital system. Using the digital system, the mobile communication systems can now transmit increased amounts of data to users at higher speeds.

Generally, in digital mobile communication systems where a variation in channel condition is significant and different types of service traffic channels coexist with each other, a Hybrid Automatic Repeat Request (hereinafter referred to as "HARQ") scheme is used to meet demand for high-speed data transmission, i.e., to increase transmission throughput. Particularly, as commercialization of high-speed data transmission service is realized, analysis and research are actively performed for efficiently applying a HARQ scheme using error correction codes with a variable code rate, rather than a HARQ scheme using existing error correction codes with a fixed code rate. For a channel structure for high-speed transmission, a method of using high-level modulation such as 8-ary phase shift keying (8-PSK) and 16-ary quadrature amplitude modulation (16-QAM) beside the general binary phase shift keying (BPSK) or quadrature phase shift keying (QPSK), as a modulation scheme, is also taken into consideration.

Currently, a Code Division Multiple Access 2000 (CDMA2000) First Evolution Data and Voice (1x EV-DV) system, which is a new transmission standard of a synchronous Third Generation Partnership Project (3GPP2) CDMA system, has adopted a coding scheme using quasi-complementary turbo codes (QCTC) as its standard. The quasi-complementary turbo codes provide a variable code rate to a coding scheme for a HARQ scheme over a high-speed data connection and provide improvement in soft combining performance using HARQ. In the 1x EV-DV system, packet data transmission/reception is performed by an HARQ or fast HARQ operation of a physical layer. This will be described in detail with reference to FIGS. 1 and 2.

FIG. 1 is a block diagram illustrating a relationship between an upper layer and a physical layer for ARQ processing according to the prior art. Referring to FIG. 1, a physical layer 110 decodes data received over a radio channel and provides decoded frame data. The physical layer 110 delivers the decoded frame data to a MAC layer 120 which is an upper layer. The MAC layer 120 determines whether the decoded frame data received from the physical layer 110 has a Protocol Data Unit (MuxPDU) error. When an error occurs, the MAC layer 120 retransmits the defective data. However, when no error occurs, the MAC layer 120 transmits a new frame. When processing is performed in the MAC layer 120, since data decoded in the physical layer must be delivered to the upper layer to be processed, ARQ processing speed is undesirably decreased. In addition, since high-speed data process must be performed, a load on the MAC layer 120 is increased. Hence, there have been proposed methods in which an operation performed in the upper layer is performed in the physical layer. Such methods provide a structure in which an operation in the physical layer, i.e., hardware, is performed in the same way as an operation in software. In this context, if part of the operation of FIG. 1 is applied to the physical layer, a structure for processing part of an ARQ operation in the physical layer is provided as illustrated in FIG. 2.

FIG. 2 is a block diagram illustrating a relationship between an upper layer and a physical layer for improved fast (physical) HARQ processing. With reference to FIG. 2, a description will now be made of a relationship between an upper layer and a physical layer for improved fast HARQ processing. A structure of FIG. 2 is realized when the structure of FIG. 1 is performed in the physical layer. It should be noted that such a structure has never been proposed up to now. In other words, it should be noted that the concept of FIG. 2 is expected by applying currently proposed methods, this has never been actually implemented, and no discussion has been made on the operations that will be described in the detailed description section below.

In FIG. 2, part of an ARQ operation that has been performed in a MAC layer 230 is performed in a physical layer or its intermediate layer, for fast ARQ response and processing. That is, in this scheme, a physical layer 200 has a basic physical layer 210 performing the same operation as that of FIG. 1, and an HARQ controller 220. The HARQ controller 220 performs part of the operation that was performed in the conventional MAC layer. Therefore, the HARQ controller 220 is included in the physical layer in structure, but performs part of an operation of the MAC layer 230. Because of such characteristics, the HARQ controller 220 is often classified as a MAC layer. However, since the physical layer determines data retransmission, a processing time for the same data is shortened.

In addition, NAK transmission in the upper layer cannot perform soft combining for the same data, because the physical layer can maintain a soft combined value for each symbol. However, since data symbols delivered from the physical layer to the MAC layer are all expressed with a binary value (0 or 1), although a symbol is repeated by retransmission, there is no way to soft combine the repeated symbol. The only method is a majority voting method for calculating the number of 0s and 1s for symbols having a binary value, and comparing the number of 0s with the number of 1s to decide a majority symbol. However, this method also cannot be used in the upper layer because of its required calculations. On the contrary, NAK transmission in the physical layer enables soft combining of code symbols for the same encoder packet, contributing to efficient utilization of channel resources.

Therefore, it is preferable to locate the HARQ controller 220 under a multiplexing sublayer 230 of the MAC layer. That is, it is preferable for the MAC layer to perform an operation of the physical layer.

This structure has a fast processing time compared with a conventional ARQ control method operating based on a radio link protocol (RLP). This will now be compared with the existing method. In the conventional method of FIG. 1, a NAK signal is received from one packet transmission, and a round trip delay of a minimum of about 200 msec occurs up to a time when a retransmission packet is transmitted due to the NAK signal. On the contrary, in the method of FIG. 2, HARQ generates a very short round trip delay of a minimum of about several milliseconds. Therefore, it has a very good structure for implementing adaptive modulation and coding (AMC).

In order to actually operate HARQ with the structure of the upper layer and the physical layer of FIGS. 1 and 2, a retransmission protocol of a transmitter for a retransmission request (i.e., NAK transmitted from a receiver) is required. For this, the 3GPP2 CDMA2000 1x system uses Asynchronous and Adaptive Increment Redundancy (AAIR), and this will be described below.

A base station asynchronously performs packet transmission to a corresponding mobile station according to the quality of a forward channel. At this point, a modulation scheme and a code rate of the transmission packet are adaptively applied according to a channel condition. In addition, a packet transmission failure during initial transmission is retransmitted, and during retransmission, a code symbol pattern that is different from that at the initial transmission can be transmitted. Such an AAIR retransmission scheme increases a signal-to-noise ratio (SNR) of packet data due to an increase in the number of retransmissions, and increases a coding gain due to a decrease in a code rate, thereby improving transmission/reception performance of packet data.

A channel used for transmission of forward packet data in the 1x EV-DV system includes a forward packet data channel (F-PDCH) for payload traffic and a forward packet data control channel (F-PDCCH) for controlling the F-PDCH. F-PDCH is a channel for transmitting an encoder packet (EP) which is a transmission data block, and a maximum of up to 2 channels are used to simultaneously transmit their encoder packets to 2 mobile stations by time division multiplexing (TDM)/code division multiplexing (CDM). An encoder packet is encoded by a turbo encoder, and then divided into 4 subpackets having different Increment Redundancy (IR) patterns by OCTC symbol selection. The subpacket is a transmission unit for initial transmission and retransmission, and at each transmission, an IR pattern of a subpacket is identified by a subpacket identifier (SPID). A modulation scheme (QPSK, 8PSK or 16QAM) and a transmission slot length (1, 2 or 4 slots) of the subpacket are determined according to forward channel quality information transmitted from a mobile station and resources (the number of Walsh codes and power assignable to F-PDCH) of a base station.

Information related to demodulation and decoding of F-PDCH is multiplexed with F-PDCH through other orthogonal channels for the same slot period, and then transmitted over the F-PDCCH which is a control channel. Information included in the F-PDCCH is very important for performing a physical layer's HARQ operation by a mobile station, and requires the following:

1) fragmented Walsh code information available for F-PDCH every several tens to several hundreds milliseconds;

2) MAC_ID: MAC_ID of a mobile station (MS) to which F-PDCH is assigned;

3) ACID: ID for identifying 4 ARQ channels (ARQ channel ID);

4) SPID: ID for identifying an IR pattern of a subpacket;

5) EP_NEW: information for distinguishing two consecutive encoder packets in the same ARQ channel;

6) EP_SIZE: a bit size of an encoder packet; and

7) LWCI (Last Walsh Code Index): information on a Walsh code used for F-PDCH.

Meanwhile, packet data reception in a mobile station is performed by decoding the F-PDCCH. A mobile station first decodes F-PDCCH to determine whether its own packet is being transmitted, and if it is determined that the transmitted packet is its own packet, the mobile station performs demodulation and decoding on F-PDCH. If a currently received subpacket is a subpacket that was retransmitted for a previously received encoder packet, the mobile station performs decoding by code-combining the currently received subpacket with code symbols of an encoder packet that was previously received and stored therein. If the decoding is successful, the mobile station transmits an ACK signal over a reverse ACK/NAK transmission channel (R-ACKCH), allowing the base station to transmit the next encoder packet. If the decoding is not successful, the mobile station transmits a NAK signal, requesting the base station to retransmit the same encoder packet.

A unit for which a physical layer's HARQ operation is performed on one encoder packet is called an "ARQ channel." In the CDMA2000 1x EV-DV system, a maximum of 4 ARQ channels can simultaneously operate, and these are called "N=4 fast HARQ channels."

In the 1x EV-DV standard, it is provided that ACK/NAK_DELAY necessary for performing by a mobile station a packet reception operation and transmitting ACK/NAK and the number of simultaneously available ARQ channels should be provided to a base station by the mobile station, and this becomes an implementation issue for a mobile station. Therefore, a possible ACK/NAK_DELAY supported by the mobile station is 1 slot (=1.25 msec) or 2 slots (2.5 msec), and the possible number of ARQ channels is 2, 3 or 4. With reference to FIGS. 3 and 4, a description will now be made of an operation depending on ACK/NAK_DELAY and the number of ARQ channels.

FIG. 3 is a timing diagram between a base station and a mobile station for ACK/NAK_DELAY=1 slot in HARQ in a mobile communication system, and FIG. 4 is a timing diagram between a base station and a mobile station for ACK/NAK_DELAY=2 slots in HARQ in a mobile communication system.

It will be assumed in FIGS. 3 and 4 that a forward packet data channel (F-PDCH) is assigned to a mobile station A. In addition, for the convenience of explanation, indexes are sequentially assigned to time slots of both a base station (BS) and a mobile station (MS) from $0^{th}$ time slot beginning at a particular time. Further, in FIGS. 3 and 4, A(x,y) has the following meaning. Hatched parts refers to data to be transmitted to the mobile station A. In addition, 'x' refers to an ARQ channel, and 'y' refers to an index for distinguishing an IR pattern for the same encoder packet. Based on this, a description will now be made of FIG. 3 in which ACK/NAK_DELAY is 1 slot.

Referring to FIG. 3, data from a base station is transmitted to a mobile station A at a $0^{th}$ slot. Then, the mobile station A receives the packet data at the same slot. In FIGS. 3 and 4, the base station and the mobile station have different slot start points due to transmission delay occurring between the mobile station and the base station on the basis of an absolute time. At this point, the base station transmits packet data and a packet data control signal over a forward packet data channel (F-PDCH) and a forward packet data control channel (F-PDCCH), respectively. Then, the mobile station A determines whether the data has an error, for a one-slot processing time, and thereafter, transmits ACK or NAK to the base station. The "processing time" refers to a time required for performing demodulation and decoding on received packet data for one slot, and transmitting the result at the next slot over a reverse channel (R-ACKCH). For example, in FIG. 3, NAK is transmitted. The base station then receives the NAK at a $3^{rd}$ slot, and schedules retransmission of the defective data at a $4^{th}$ slot. Thereafter, the base station transmits data of a different pattern for the same encoder packet according to the scheduling result.

Next, a description will be made of FIG. 4 in which ACK/NAK_DELAY is 2 slots. It will be assumed in FIG. 4 that an error has occurred in a first data packet among the data packets transmitted from a base station to a mobile station A, and the description will be focused on the first data packet. Since the delay time is 2 slots, the base station continuously transmits packet data to the mobile station A at a $0^{th}$ slot, a $1^{st}$ slot and a $2^{nd}$ slot. The mobile station then checks an error of the data transmitted at the $0^{th}$ slot for a period of the $1^{st}$ to the $2^{nd}$ slots, checks an error of the data transmitted at the $1^{st}$ slot for a period of the $2^{nd}$ to $3^{rd}$ slots, and checks an error of the data transmitted at the $2^{nd}$ slot for a period of the $3^{rd}$ to $4^{th}$ slots. ACK/NAK for the data received at the $0^{th}$ slot is transmitted at the $3^{rd}$ slot, ACK/NAK for the data received at the $1^{st}$ slot is transmitted at the $4^{th}$ slot, and ACK/NAK for the data received at the $2^{nd}$ slot is transmitted at a $5^{th}$ slot. If the base station receives, at the $4^{th}$ slot, NAK for the packet data transmitted at the $0^{th}$ slot, the base station performs, at the next slot, retransmission on an encoder packet transmitted at the $0^{th}$ slot. The retransmitted packet data is the same packet as the previously transmitted packet but has a different IR pattern.

As can be understood from FIGS. 3 and 4, the mobile station performs synchronous ACK/NAK transmission in which the mobile station must transmit ACK or NAK for a received packet after a lapse of 1 slot or 2 slots. The base station performs asynchronous ACK/NAK transmission in which the base station can transmit a packet at any slot after receiving ACK/NAK for a packet previously transmitted by the mobile station for the same ARQ channel.

In addition, FIGS. 3 and 4 illustrate a 1-channel ARQ operation and a 4-channel ARQ operation, respectively. In the 1-channel ARQ operation of FIG. 3, data transmission to one mobile station uses only a part of base station resources, decreasing a packet data rate of a corresponding mobile station. In contrast, in the 4-channel ARQ operation of FIG. 4, one mobile station can use the entire resources of the base station, so a corresponding mobile station can obtain a maximum packet data rate.

As illustrated in FIG. 4, upon receiving packets A(0,0), A(1,1) and A(2,0), a receiver soft-combines these packets before decoding or decodes the received packets without soft combining. The receiver performs cyclic redundancy check (CRC) to determine whether an error has occurred in the decoded data, and transmits ACK/NAK over a reverse channel according to the CRC result. Such an operation can be performed every 1.25 msec.

However, in a 1x EV-DV system for a high-speed data service, an architecture between a host (or CPU) and an output buffer for decoding a received packet and transmitting the decoded packet to the host can also become an important design factor. This is because in the 1x EV-DV high-speed data service system, a transmission time of a packet, a kind of a transmission frame, is as short as about 1.25 msec, whereas the number of bits included in one packet is greatly increased to several thousands of bits. This means a large increase in a channel decoding time required for decoding one packet. Therefore, an abrupt decrease in a time assignable for data transmission out of the processing time assigned to the receiver occurs. In addition, due to inconsistency of orders caused by retransmission, even an error-free transmission packet received successfully can lack continuity because of discrepancy in a decoding time. That is, received packets may be discontinuous, losing their continuity.

Generally, a current medium- and low-speed data system uses such decoders as a turbo decoder or a Viterbi decoder as a channel decoder. In such a system, a single output buffer or a double output buffer has been used in order to transmit data from a decoder to a host. However, as high-speed data service for the 1x EV-DV system becomes popular, the existing output buffer's structure has the following problems. If the following problems cannot be solved, a host having the existing processing capability must assign most of its processing capability for data transmission. Therefore, the host cannot perform processing functions of other adjacent blocks and its upper protocol. In addition, if a very fast host is adopted to solve such problems, unnecessary power consumption may occur for other functions except the data transmission. A detailed description will now be made of the problems which may occur when a high-speed data service is processed with the current system.

(1) Currently, in most systems, when a channel decoder transmits data to a host, data transmission from the channel decoder to the host is controlled by the channel decoder. Therefore, the channel decoder is designed to send the host an interrupt for data transmission upon completion of decoding. In the case of a low-speed data processing system, a buffer storing data has a single buffer structure. In addition, the system assigns part of the entire processing time given for decoding as a time for data transmission, and completes transmission of all data during the assigned time period. However, an increase in a data rate causes an increase in a decoding time. Therefore, such a single buffer structure transmitting data using part of the entire processing time given for decoding can no longer be used.

(2) In a low-speed system or a system requiring faster data processing than the low-speed system, a double buffer structure is used in order to solve the above problems. The double buffer structure provides a method for extending a decoding time and a data transferring time by alternately designating two buffers to read/write modes. In this method, an interval at which an interrupt for data transmission occurs is relatively long. Thus, from the viewpoint of the host, this method is efficient when a large volume of data is transmitted by one interrupt. However, in the 1x EV-DV system supporting a high-speed data service, most decoding frames have a very short time, whereas the number of bits included in a corresponding decoding frame is very highly increased. Therefore, although such a method is used, excessive data transmission burden is imposed on the host due to frequent occurrence of the interrupt, so the host may not perform its unique tasks.

(3) In addition, the 1x EV-DV system supporting a high-speed data service uses a variable processing time mode by including a channel decoder in order to reduce a processing burden on a receiver. The 1x EV-DV system identifies the variable processing time mode using ACK_DELAY, and a mobile station can be assigned a processing time of 1 slot (1.25 msec) or 2 slots (2.5 msec) according to a value of ACK_DELAY. Under this condition, it is efficient that an output buffer structure of the receiver has a structure that adaptively operates according to a processing time mode.

However, since the existing systems use only one fixed processing time mode, they cannot be adaptively used according to ACK_DELAY.

(4) Furthermore, most of the current systems use a channel supporting a circuit mode service. Therefore, the current system does not support physical layer HARQ, and its receiver does not use soft combining due to retransmission. Thus, an identifier (ID) of a decoded frame decoded by a channel decoder is not required. However, the 1x EV-DV high-speed data service system supports a pure packet mode. Therefore, a reception time and a decoding-completed time of each packet may be in discord with transmission order of the corresponding packet. Thus, there is a demand for an apparatus for solving such problems.

SUMMARY OF THE INVENTION

It is, therefore, an object of the present invention to provide an output buffer control apparatus and method for transmitting data decoded by a channel decoder while reducing a load on a processor in a high-speed data service system.

It is another object of the present invention to provide an output buffer control apparatus and method for securing a decoding time of a channel decoder in a high-speed data service system.

It is further another object of the present invention to provide an output buffer control apparatus and method for delivering channel-decoded data to a processor irrespective of an acknowledgement delay time ACK_DELAY_TIME in a high-speed data service system.

It is yet another object of the preset invention to provide an output buffer control apparatus and method for preventing wrong error detection caused by discontinuity of packet data retransmitted based on Hybrid Automatic Repeat Request (HARQ) in a high-speed data service system.

It is still another object of the present invention to provide an output buffer control apparatus and method for enabling fast response to received packet data in a high-speed data service system.

To substantially achieve the above and other objects, a mobile station apparatus provides for receiving packet data transmitted over a packet data channel, decoding the received packet data and delivering the decoded packet data to an upper layer in a mobile communication system transmitting packet data transmitted over a forward packet data channel and transmitting, over a forward packet data control channel, demodulation and decoding information of packet data transmitted over the forward packet data channel. The apparatus comprises a fast turbo decoder for decoding packet data received over the packet data channel depending on information received over the forward packet data control channel, storing the decoded data, and outputting buffer information of the stored data; an output buffer for storing the received packet data, and outputting the packet data upon receiving a read request. The apparatus further comprises an output buffer controller for receiving information on the decoded data and the buffer information from the fast turbo decoder, and generating an interrupt signal and a read address for reading data stored in the output buffer using the received data information and buffer information; and a processor for reading data stored in the output buffer according to the read address upon receiving the interrupt signal from the output buffer controller.

Preferably, the output buffer comprises a dualized area for storing the decoded data, and when data is read from one area of the output buffer, the fast turbo decoder decodes the read data and stores the decoded data in another area after completion of decoding.

Preferably, the buffer information includes area information and address information of the buffer where the decoded data is stored, and the decoded data information includes at least one of error information of the decoded data, status information of the decoder, and decoding-done information.

Preferably, the output buffer controller comprises a page buffer selector for receiving a system time signal of a receiver, selecting one of the dualized buffers according to a 1-slot delay response mode, and selecting a given page of the selected buffer; a stop position selector for receiving the system time signal and a decoding clock, and generating a stop position signal that can be randomly set in one slot; a flag generator being cleared according to the system time of the receiver, for outputting a flag according to a turbo decoder enable signal of the packet data; a buffer selector for receiving a signal of the flag generator, an output signal of the stop position selector, and the turbo decoder enable signal, and selecting one of the dualized buffers according to a 2-slot delay response mode; a page selector for selecting a page of the selected buffer according to the 2-slot delay response mode; and an interrupt controller for generating an interrupt signal by receiving signals from the page buffer selector, the buffer selector and the page selector, and buffer status signals from the dualized buffers.

Preferably, the output buffer controller is included in a Hybrid Automatic Repeat Request (HARQ) controller located in a physical layer.

Preferably, the decoded data information includes at least one of error information of the decoded data, status information of the decoder, and decoding-done information.

Preferably, the output buffer controller generates an interrupt signal and a read address for data reading, when at least two data packets are received.

To substantially achieve the above and other objects, a method provides for delivering decoded data to an upper layer in a mobile station apparatus including a decoder for decoding received packet data, a dualized output buffer for storing the decoded data and an output buffer controller for delivering data stored in the output buffer to the upper layer in a mobile communication system transmitting packet data transmitted over a forward packet data channel and transmitting, over a forward packet data control channel, demodulation and decoding information of packet data transmitted over the forward packet data channel. The method comprises the steps of receiving decoded data information and buffer information from the decoder; generating an interrupt signal and output buffer information for delivering the decoded data to the upper layer if a predetermined time has passed; and stopping interrupt if data transmission to the upper layer is completed.

Preferably, the buffer information includes area information and address information of the buffer where the decoded data is stored, and the decoded data information includes at least one of error information of the decoded data, status information of the decoder, and decoding-done information.

To substantially achieve the above and other objects, a method provides for delivering decoded data to an upper layer in a mobile station apparatus including a decoder for decoding received packet data, a dualized output buffer for storing the decoded data, and an output buffer controller for delivering data stored in the output buffer to the upper layer in a mobile communication system transmitting packet data transmitted over a forward packet data channel and transmitting, over a forward packet data control channel, demodulation and decoding information of packet data transmitted over the forward packet data channel. The method comprises the steps of receiving decoded data information and buffer information from the decoder; generating an interrupt signal and output buffer information for delivering the decoded data to the upper layer if a predetermined number of data blocks are decoded by the decoder and stored in the output buffer; and stopping interrupt if data transmission to the upper layer is completed.

Preferably, the buffer information includes area information and address information of the buffer where the decoded data is stored, and the decoded data information includes at least one of error information of the decoded data, status information of the decoder, and decoding-done information.

Further, the method comprises the steps of: generating output buffer information and an interrupt signal for delivering the decoded data to the upper layer if no packet data is received over the packet data channel within a predetermined time; and stopping interrupt if data transmission to the upper layer is completed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
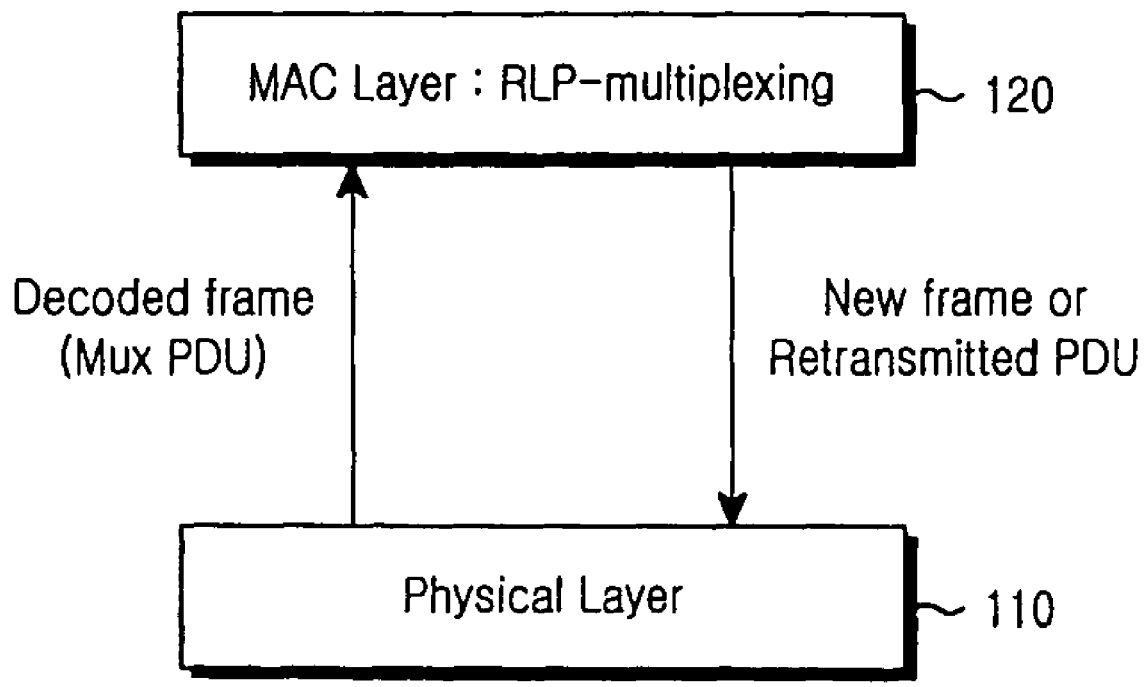
FIG. 1 is a block diagram illustrating a relationship between an upper layer and a physical layer for Automatic Repeat Request (ARQ) processing according to the prior art.
Figure 2:
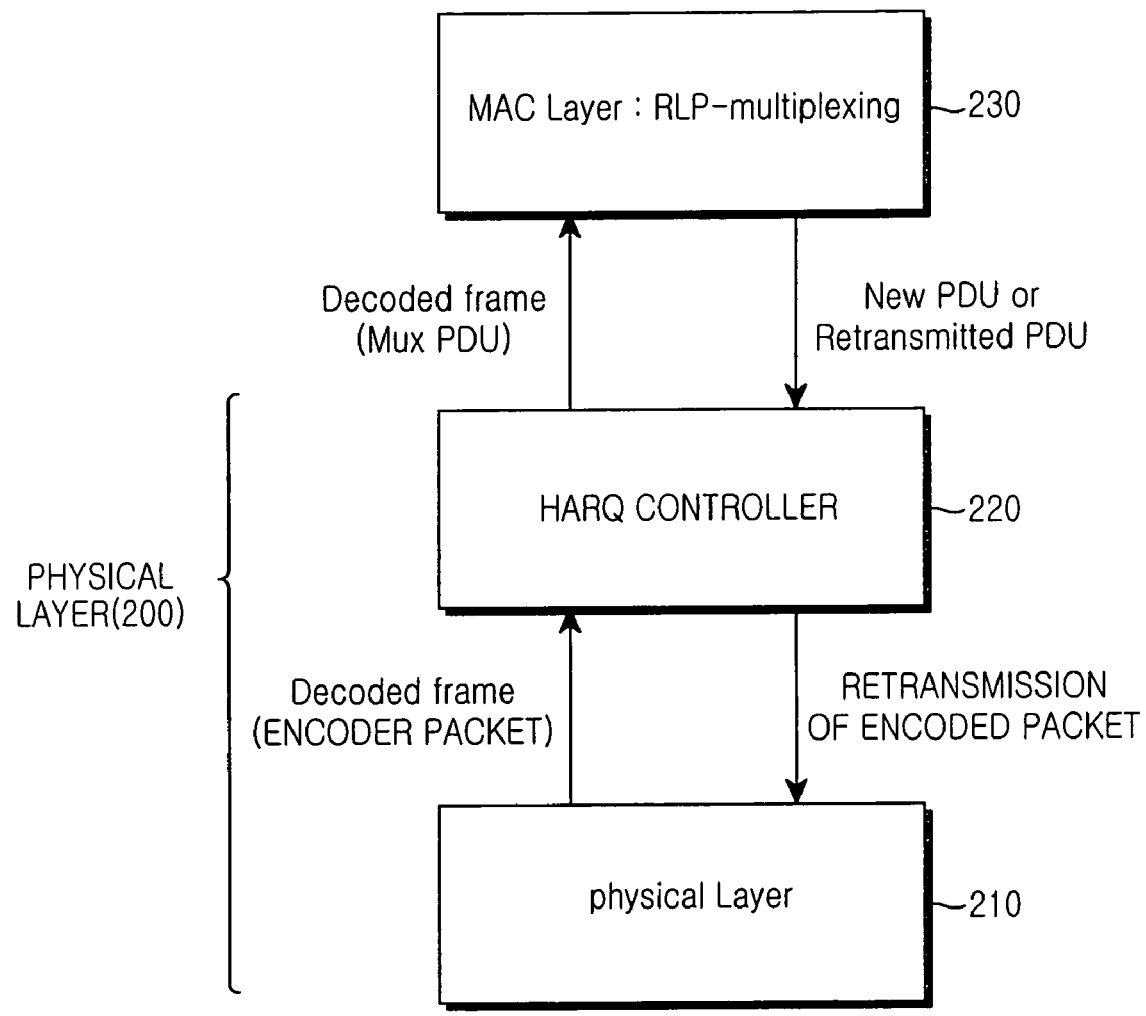
FIG. 2 is a block diagram illustrating a relationship between an upper layer and a physical layer for improved fast (physical) Hybrid Automatic Repeat Request (HARQ) processing.
Figure 3:
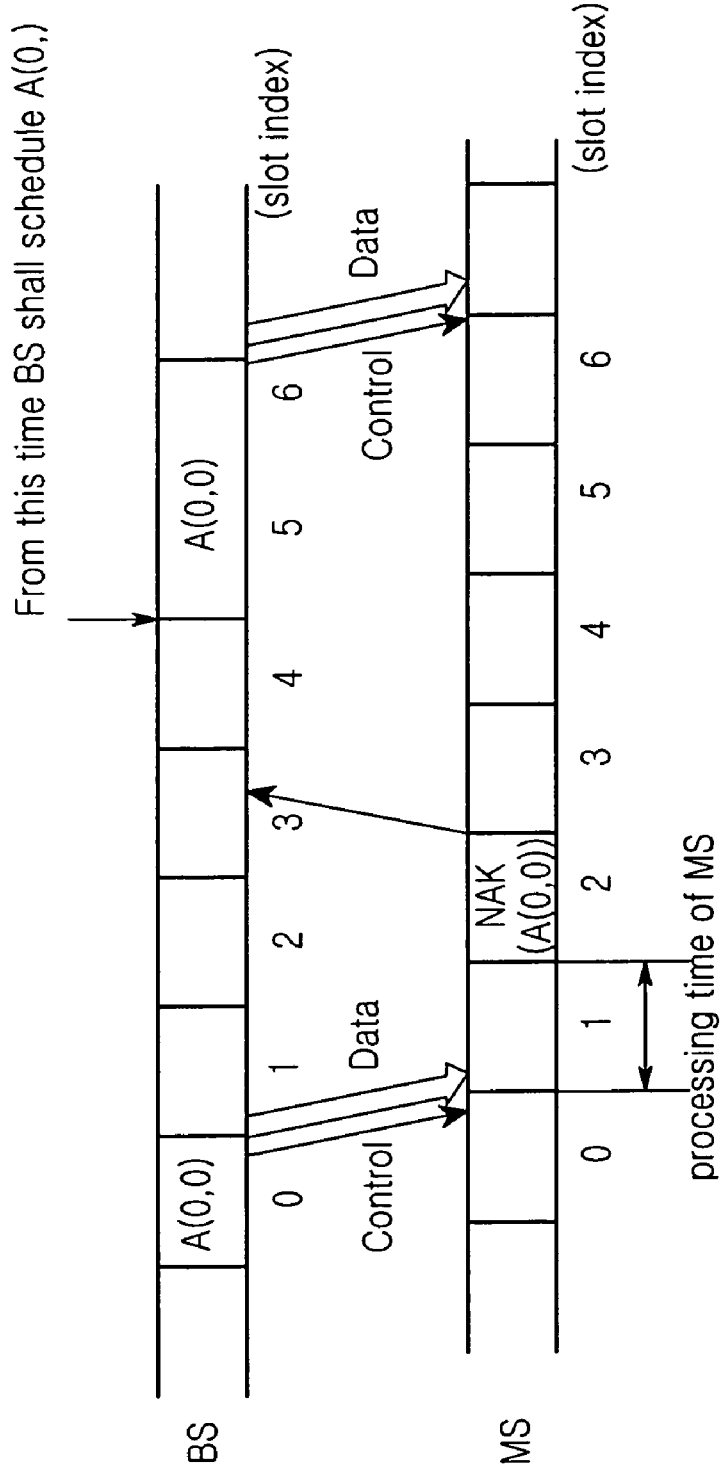
FIG. 3 is a timing diagram illustrating a relationship between a base station and a mobile station for ACK/NAK_DELAY=1 slot in HARQ in a mobile communication system.
Figure 4:
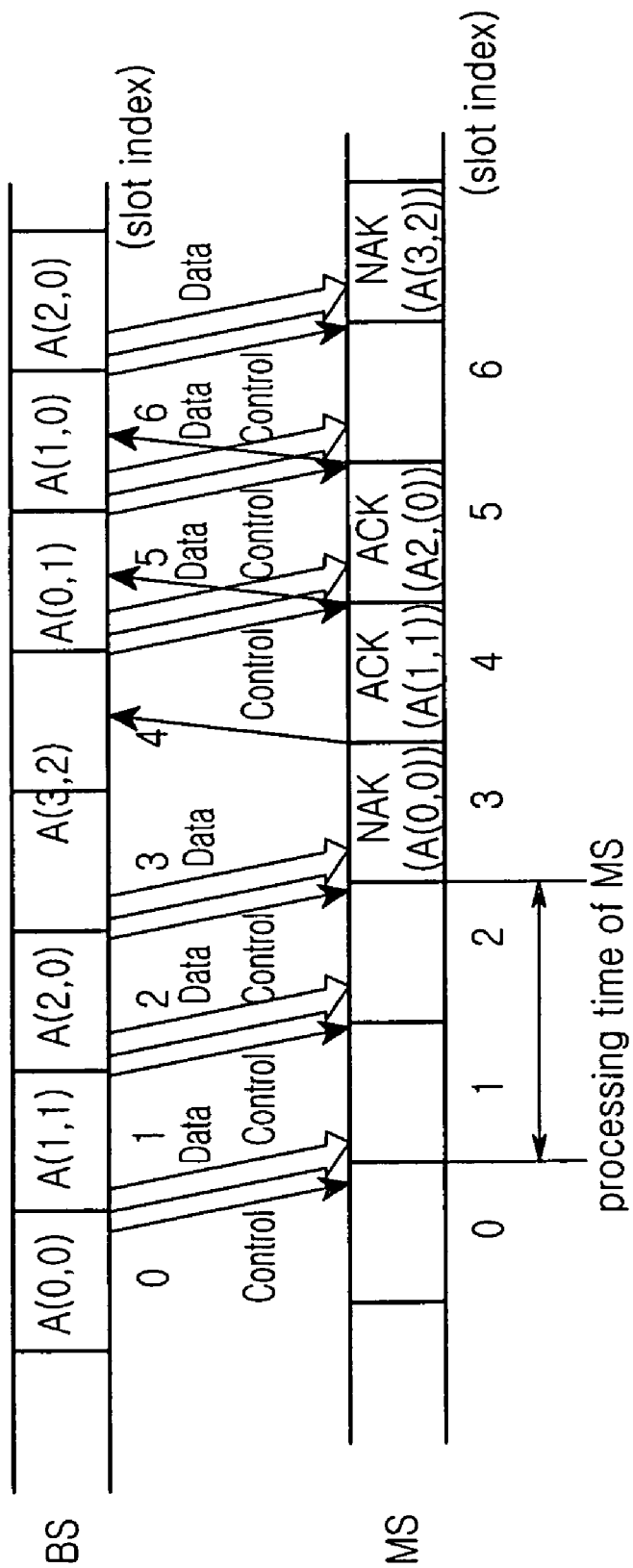
FIG. 4 is a timing diagram illustrating a relationship between a base station and a mobile station for ACK/NAK_DELAY=2 slots in HARQ in a mobile communication system.

An embodiment of the present invention will now be described in detail with reference to the accompanying drawings. In the drawings, the same or similar elements are denoted by the same reference numerals. In the following description, a detailed description of known functions and configurations incorporated herein has been omitted for conciseness.

A system according to the present invention will now be described in detail, compared with the current available technology.

First, most available systems hold a structure in which an output buffer is included in a channel decoder (e.g., turbo decoder or a Viterbi decoder), and a host transmits data in the buffer using an address bus and a data bus. That is, in the currently available system, the channel decoder generates an interrupt directly to the host when it desires to transmit data in the output buffer to the host. However, in the embodiment of the present invention, an output buffer controller (OBUFC) delivers an interrupt for data transmission to the host, for transmission of data in the channel decoder. The output buffer controller receives a signal indicating completed decoding from the channel decoder through, for example, interrupt, signaling, or flag. Based on a value of this signal and output buffer's status information stored in the output buffer controller, if it is determined that data transmission is necessary, the output buffer controller sends the host an interrupt for data transmission.

Second, the output buffer controller has two available new interface structures in order to generate an interrupt to the host.

A first interface is an interface between the output buffer controller and the channel decoder. The interface between the output buffer controller and the channel decoder sends the channel decoder address generation information for determining a storage position of the output buffer where data completely decoded by the channel decoder is to be stored. In addition, the interface between the output buffer controller and the channel decoder sends the output buffer controller an interrupt, signaling or flag indicating that decoding is completed in the channel decoder.

Another interface is an interface between the output buffer controller and the host. The interface between the output buffer controller and the host sends the host data stored in the output buffer. Therefore, the interface between the output buffer controller and the host sends the following information in order to deliver data decoded by the channel decoder from the output buffer controller to the host. First, the interface sends address information indicating a position where the channel-decoded data is stored in the output buffer. Second, the interface sends information related to the channel-decoded data, for example, size, type and time of a frame. Third, the interface sends an interrupt requesting transmission of data stored in the output buffer. In addition, the interface between the output buffer controller and the host sends signaling or flag indicating completed transmission of data in the output buffer, from the host to the output buffer controller.

Third, the channel decoder includes an output buffer capable of storing a plurality of decoded data frames. In the currently available system, the channel decoder includes an output buffer for storing one decoded frame. However, in the embodiment of the present invention, the channel decoder is designed to have a plurality of output buffer spaces. A maximum size of the output buffer included in the channel decoder is determined according to a size of a decoded frame which is a data block output from the channel decoder, and the maximum number of accumulated decoded frames, requested by the host. In addition, the output buffer included in the channel decoder has a double buffer structure. The the double buffer structure is used to enable the channel decoder to secure a maximum decoding time, and secure a maximum available time for data transmission to the host.

Fourth, the output buffer is designed to operate in a dual mode in order to support both of two modes of ACK_DELAY provided in the 1x EV-DV system. That is, the output buffer has a structure supporting both of the two modes with one circuit without design of a new circuit. An output buffer controller based on ACK_DELAY is separately designed, and this is integrated into one general output buffer controller. In particular, for ACK_DELAY=2 slots, a control signal for data transmission is generated using an adaptive signal control method in order to provide a maximum decoding time to the channel decoder. Therefore, variable data transmission interrupt timing control is available.

Fifth, the output buffer controller sends the host an interrupt for data transmission only when a decoded frame having no decoding error exists in the output buffer of the channel decoder. Otherwise, the output buffer controller automatically checks "Empty Buffer" so as not to generate an interrupt. The reason for designing the output buffer controller in this manner is as follows. Commonly, a host (or CPU) suffers from an initial delay for which a considerable number of commands are performed from a time when an interrupt for data transmission is generated through a time when actual data transmission is initiated. Such an overhead acts as a considerable load on an interrupt process. Therefore, when there is no transmission data decoded without an error, the output buffer controller must not generate an interrupt, thereby reducing a data processing burden on the host.

Sixth, the output buffer controller transmits a reception time of each decoded frame, e.g., system time SYS_TIME, to the host along with the decoded data. Such reasons are as follows. The host sends decoded data to the output buffer only when an interrupt is generated from the output buffer controller. That is, several frames decoded by the channel decoder are accumulated and then transmitted to the host. The decoded data delivered to the host has a timing gap between a time when actual channel decoding is performed and a time when the data is transmitted to the host. In the case of general service traffic, the timing gap is negligible. However, when receiving a control message requesting a fast response, for example, channel setup and supervision messages, a host of a mobile station requires reception time information. Therefore, the output buffer controller provides reception time information of each decoded frame taking such an occasion into consideration. In this manner, the host can detect a reception time of each decoded frame using the received system time information. In addition, the host can transmit various parameters altogether required by an upper layer, observed in a receiver. For example, in a normal mode, the host transmits only the above parameters, and in a test mode or an observation mode, the host can gather various parameters observed in the receiver and transmit the gathered parameters. Therefore, in the embodiment of the present invention, parameters delivered to the upper layer are not limited to the above-stated parameters.

Similarly, in the Evolution Data and Voice (1x EV-DV) system, a maximum of 4 Automatic Repeat Request (ARQ) channels are used in series. Therefore, the host requires , a retransmission channel ID (ACID) which is information for identifying an ARQ channel. As a result, the output buffer controller according to the embodiment of the present invention transmits ACID of each decoded frame to the host during data transmission.

Figure 5:
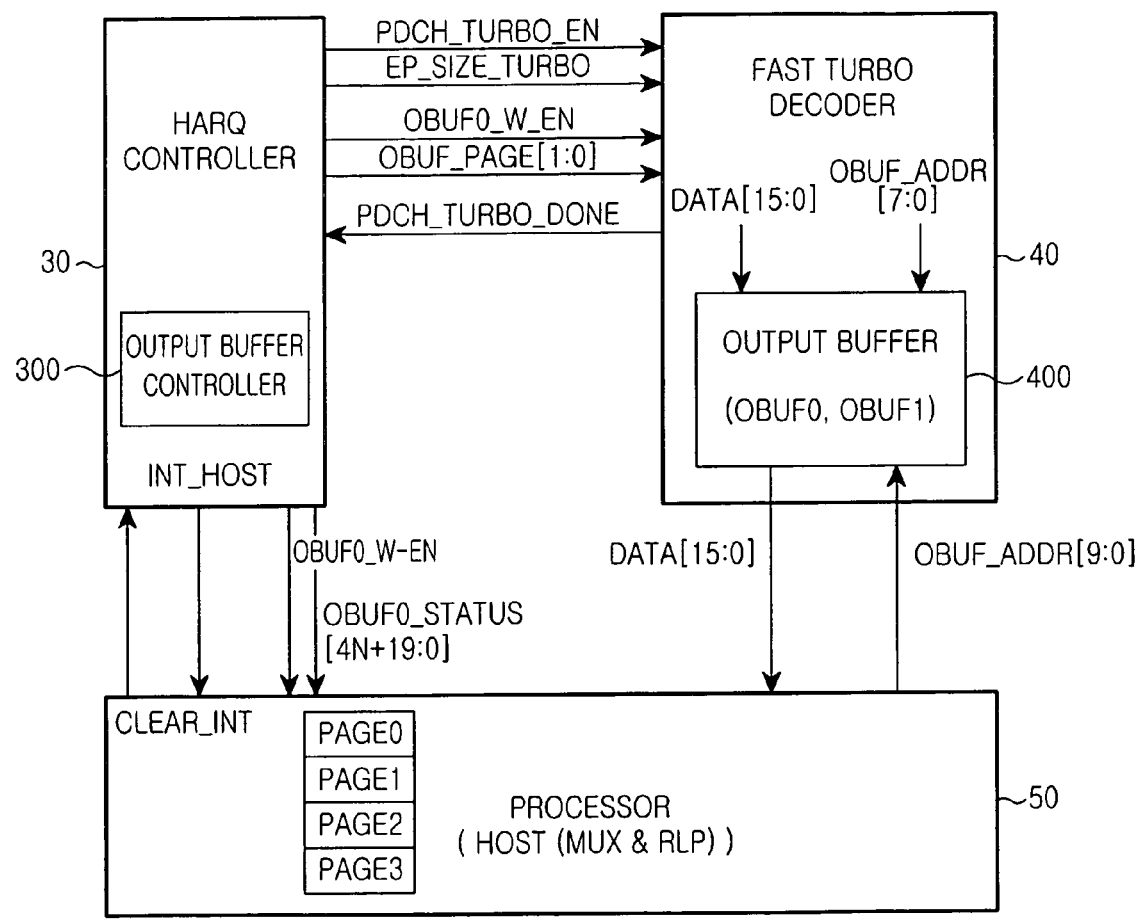
FIG. 5 is a block diagram illustrating the connection between an HARQ controller, an output buffer controller, and an output buffer according to an embodiment of the present invention.

FIG. 5 is a block diagram illustrating the connection between a Hybrid Automatic Repeat Request (HARQ) controller, an output buffer controller, and an output buffer according to an embodiment of the present invention. The connection and operation of the output buffer controller will now be described with reference to FIG. 5.

As illustrated in FIG. 5, an output buffer controller 300 is included in a HARQ controller 30. Actually, however, the output buffer controller 300 may not be included in the HARQ controller 30. The reason why the output buffer controller 300 is included in the HARQ controller 30 is because it is assumed that the HARQ controller 30 has already received a signal that the output buffer controller 300 requires. For the convenience of explanation, it will be herein assumed that the output buffer controller 300 is included in the HARQ controller 30. In addition to the output buffer controller 300, the HARQ controller 30 includes therein a state part (not shown) for outputting a state transition signal according to each operation mode, a state function part (not shown) for controlling an operation according to each state, and a register (not shown) for storing internally processed data or storing a signal. In addition, the HARQ controller 30 receives a turbo decoding-done signal PDCH_TURBO_DONE of a packet data channel from a fast turbo decoder 40. The turbo decoding-done signal of a packet data channel is input to the HARQ controller 30 when the fast turbo decoder 40 receives packet data from a packet data channel and completes turbo decoding of the received packet data. In this state, the fast turbo decoder 40 stores turbo-decoded data in an output buffer 400. Upon receiving the turbo decoding-done signal of a packet data channel, the output buffer controller 300 in the HARQ controller 30 counts the turbo decoding-done signal of a packet data channel. If the count value is larger than a preset value, the output buffer controller 300 provides a processor (CPU or host) 50 with a signal for reading data stored in the output buffer 400 so that the processor 50 reads out the data stored in the output buffer 400. Herein, the preset count value is set to a value of 2 or above. The preset count value is set to a value of 2 or above to allow the processor 50 to read decoded packet data stored in the output buffer 400 by as many as two data blocks instead of reading the data stored in the output buffer 400 each time a packet is received. If the processor 50 reads data from the output buffer 400 each time decoding is completed, a load on the processor 50 is increased.

In the embodiment of the present invention, the output buffer controller 300 provides the processor 50 with an interrupt requesting the processor 50 to read the output buffer 400 when the turbo decoding-done signal of a packet data channel is received two or more times, by way of example. However, the number of the turbo decoding-done signals received, at which an interrupt is to be generated, can be set to a different value according to an expected load of the processor 50. Alternatively, the output buffer controller 300 can generate an interrupt by counting a preset time of, for example, 5 msec, in addition to setting the number of turbo decoding-done signals.

The fast turbo decoder 40 includes a dualized output buffer 400 therein. The dualized output buffer 400 stores data turbo-decoded by the fast turbo decoder 40. A position where the data is stored is appointed based on a control signal from the output buffer controller 300 included in the HARQ controller 30.

The processor 50 reads data stored in the output buffer 400 in the fast turbo decoder 40 in response to an interrupt received from the HARQ controller 30. The processor 50 can perform processing of a multiplexing (MUX) layer and a radio link protocol (RLP).

A description will now be made of input/output signals to and from the blocks illustrated in FIG. 5 and operations thereof. The HARQ controller 30 must enable the fast turbo decoder 40 upon receiving data over a packet data channel (PDCH). That is, the HARQ controller 30 provides a turbo decoder enable signal PDCH_TURBO_EN to the fast turbo decoder 40 upon receiving data over the packet data channel. Further, the HARQ controller 30 delivers size information EP_SIZE_TURBO of an encoder packet received over the packet data channel to the fast turbo decoder 40. In response, the fast turbo decoder 40 can perform turbo decoding. The fast turbo decoder 40 provides a turbo decoding-done signal PDCH_TURBO_DONE to the HARQ controller 30 when turbo decoding of the packet data channel PDCH is completed. In this manner, a decoding operation is performed in the fast turbo decoder 40. The 1x EV-DV system supports both 1-slot ACK_DELAY and 2-slot ACK_DELAY. Therefore, the output buffer 400 and the HARQ controller 30 used in a high-speed data service modem can classify decoding and data transferring times into two cases as shown in Table 1 below. In Table 1, NOS stands for the "Number of Slots" and denotes the number of slots occupied by one encoder packet for transmission.

TABLE 1

|  | 1-slot ACK_DELAY | 2-slot ACK_DELAY |
| --- | --- | --- |
| NOS = 1 | 1.25 msec + 1.25 msec | 1.25 msec + 1.25 msec or 1.25 msec + 2.5 msec |
| NOS = 2 | 2.50 msec + 1.25 msec | 2.50 msec + 1.25 msec or 2.50 msec + 2.5 msec |
| NOS = 3 | 5.00 msec + 1.25 msec | 5.00 msec + 1.25 msec or 5.00 msec + 2.5 msec |

In the case of 1-slot ACK_DELAY, demodulation and decoding of data received over a packet data channel should be completed within 1.25 msec. However, in the case of 2-slot ACK_DELAY, demodulation and decoding of data received over a packet data channel should be completed within 2.5 msec.

Figure 6:
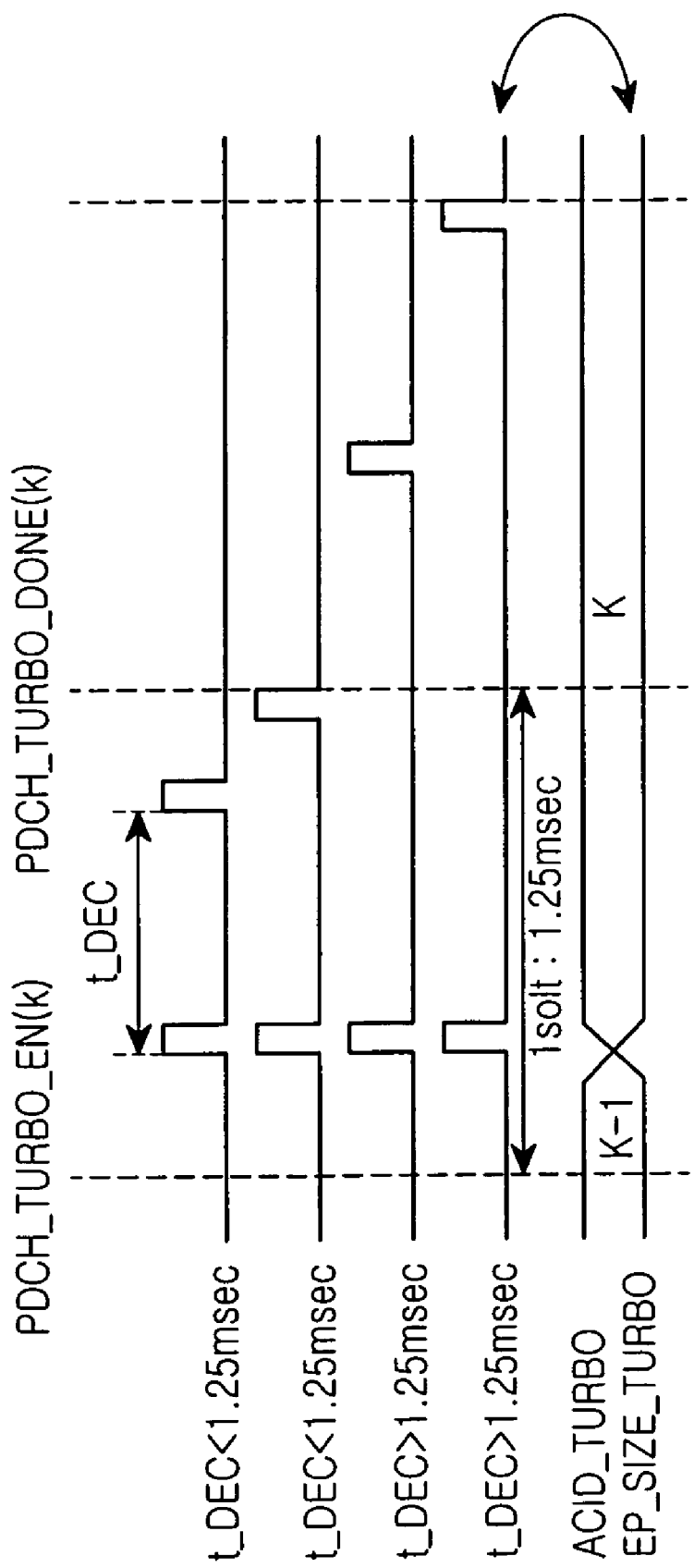
FIG. 6 is a timing diagram for possible cases where the turbo decoding-done signal PDCH_TURBO_DONE follows the turbo decoder enable signal PDCH_TURBO_EN, according to an embodiment of the present invention.
Figure 7:
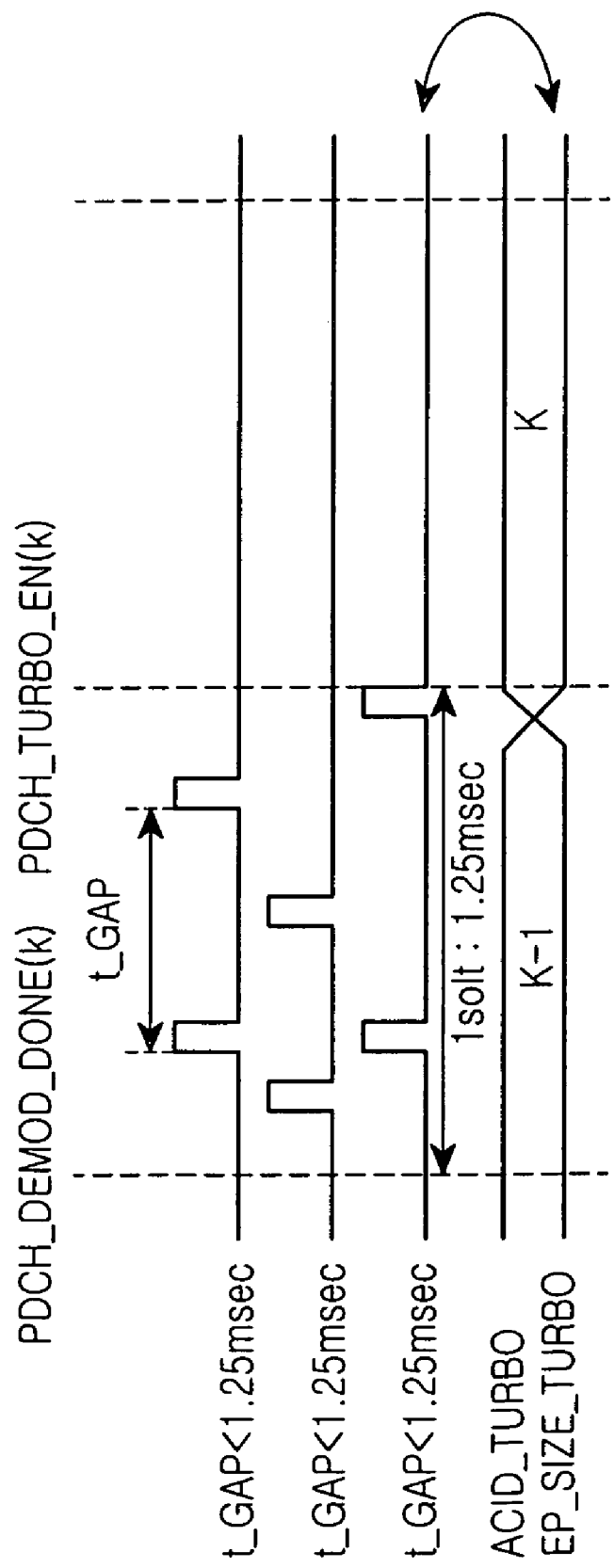
FIG. 7 is a timing diagram illustrating examples of a demodulation-done signal PDCH_DEMOD_DONE and a turbo decoder enable signal PDCH_TURBO_EN being output, according to an embodiment of the present invention.
Figure 8:
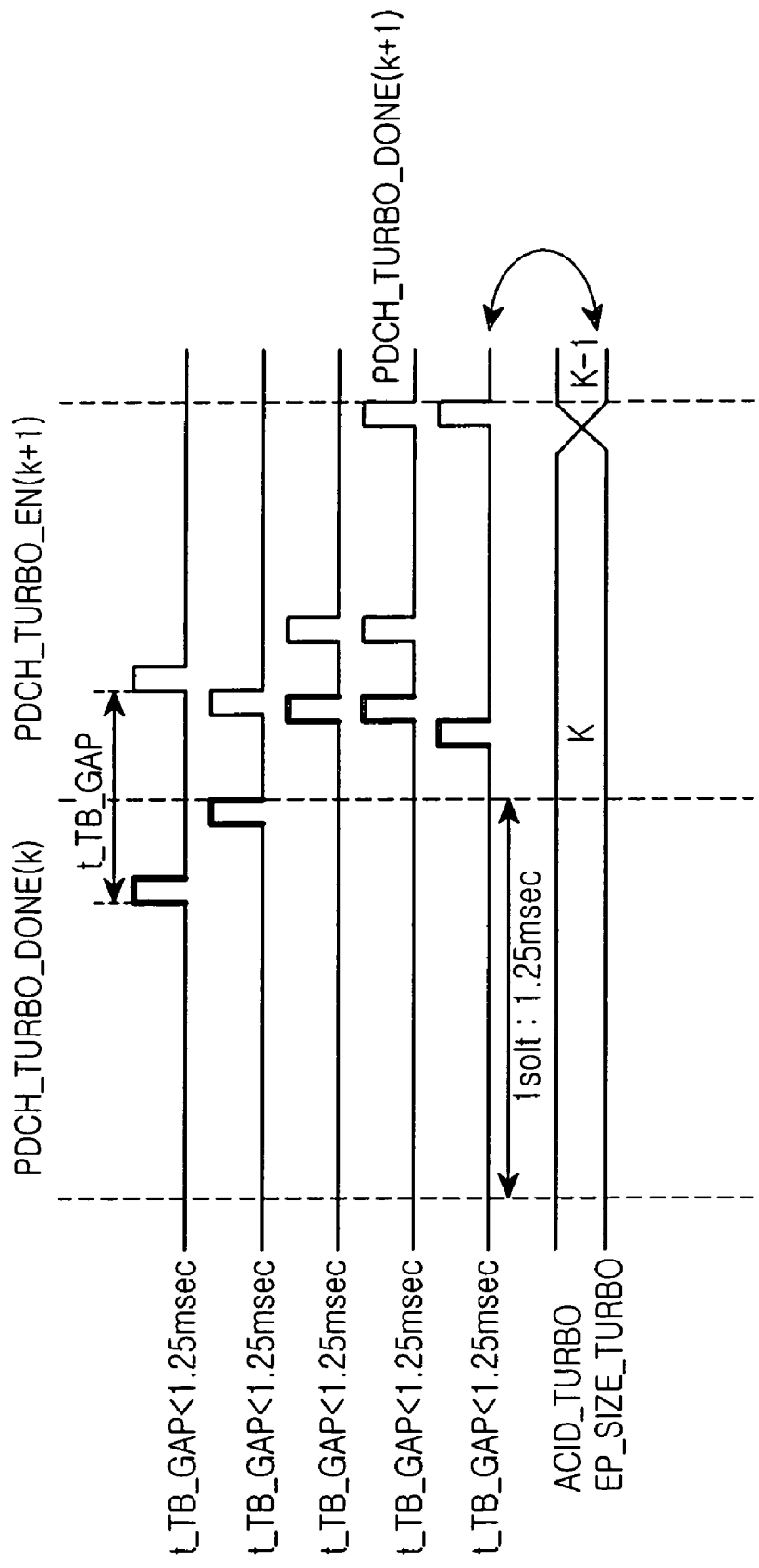
FIG. 8 is an example of a timing diagram between a turbo decoding-done signal PDCH_TURBO_DONE and its consecutive turbo decoder enable signal PDCH_TURBO_EN according to an embodiment of the present invention.

With reference to FIGS. 6 to 8, a description will now be made of timings of the turbo decoder enable signal PDCH_TURBO_EN and the turbo decoding-done signal PDCH_TURBO_DONE. FIG. 6 is a timing diagram illustrating examples of the turbo decoding-done signal PDCH_TURBO_DONE following the turbo decoder enable signal PDCH_TURBO_EN, according to an embodiment of the present invention.

A relation between the turbo decoder enable signal PDCH_TURBO_EN and the turbo decoding-done signal PDCH_TURBO_DONE illustrated in FIG. 6 can be roughly divided into two cases as mentioned above: a first case corresponds to 1-slot ACK_DELAY and a second case corresponds to 2-slot ACK_DELAY. The first case is subdivided into two cases as illustrated in FIG. 6. In one case, a decoding time t_DEC falls within 1.25 msec. That is, a turbo decoding-done signal PDCH_TURBO_DONE is generated within 1 slot after a turbo decoder enable signal PDCH_TURBO_EN is received from the HARQ controller 30. In this case, an encoder packet (EP) is small in size or a channel condition is good, so turbo decoding is rapidly completed in the turbo decoder 40 within the decoding time t_DEC of 1.25 msec. In another case, a turbo decoding-done signal PDCH_TURBO_DONE is generated at a slot boundary. In this case, a channel condition is poor or an encoder packet is large in size, so a decoding time t_DEC becomes long.

Even in the second case of 2-slot ACK_DELAY, if a channel condition is good or an encoder packet is small enough in size, a turbo decoding-done signal PDCH_TURBO_DONE is generated within two slots. However, if a channel condition is poor or an encoder packet is very large in size, a turbo decoding-done signal PDCH_TURBO_DONE is generated at a boundary of a second slot.

FIG. 7 is a timing diagram illustrating examples of a demodulation-done signal PDCH_DEMOD_DONE and a turbo decoder enable signal PDCH_TURBO_EN being output, according to an embodiment of the present invention. With reference to FIG. 7, a description will now be made of the demodulation-done signal PDCH_DEMOD_DONE and the turbo decoder enable signal PDCH_TURBO_EN generated according to an embodiment of the present invention.

In FIG. 7, a turbo decoder enable time t_GAP represents a time for which a demodulation-done signal PDCH_DEMOD_DONE of data received over a packet data channel is output and the turbo decoder 40 is enabled in response to the demodulation-done signal PDCH_DEMOD_DONE. If the HARQ controller 30 receives a demodulation-done signal PDCH_DEMOD_DONE from a PDCH demodulator, it means that an encoder packet to be decoded is waiting in a corresponding slot. Therefore, a turbo decoder enable signal PDCH_TURBO_EN must be set up in the corresponding slot.

If the turbo decoder enable signal PDCH_TURBO_EN is received, the turbo decoder 40 is enabled to decode data. Thus, the HARQ controller 30 must generate a turbo decoder enable signal PDCH_TURBO_EN at a slot where demodulation is completed. In an example of FIG. 7, a turbo decoder enable signal PDCH_TURBO_EN can be generated when demodulation is completed. In the worst case, the turbo decoder enable signal PDCH_TURBO_EN is output at a boundary of a 1.25-msec slot. Such a turbo decoder enable time t_GAP has the following 4 relationships.

(1) When a $k^{th}$ turbo demodulation-done signal PDCH_DEMOD_DONE is generated at a particular slot, a $k^{th}$ turbo decoder enable signal PDCH_TURBO_EN must be generated at the slot.

(2) The turbo decoder enable time t_GAP which is a time gap between the above two signals is always shorter than 1.25 msec.

(3) It is preferable to minimize the turbo decoder enable time t_GAP for 1-slot ACK_DELAY.

(4) For 2-slot ACK_DELAY, the turbo decoder enable time t_GAP is adaptively set according to a size EP_SIZE and a signal-to-interference ratio (C/I) of an encoder packet.

The adaptive signal control of Case (4) occurs when a size EP_SIZE of a previous encoder packet is very large or a C/I of a previous encoder packet is very low, so that the fast turbo decoder 40 requires many iterations. To this end, a decision tale or algorithm that considers a size EP_SIZE and a C/I of a previous encoder packet, and a size EP_SIZE and a C/I of a current encoder packet is required. The use of the decision table or algorithm can reduce occurrence of reverse NAK, contributing to an increase in throughput of a mobile station. In order to set such a variable turbo decoder enable time t_GAP, the HARQ controller 30 limits the number of possible positions for the turbo decoder enable signal PDCH_TURBO_EN to 16. Here, 16 is a parameter considered during design and is the maximum number of positions where the PDCH_TURBO_EN is set up. That is, it means the number of positions where the PDCH_TURBO_EN is generated, which can be artificially set in one slot by the HARQ controller 30. Therefore, if it is desirable to set positions of the PDCH_TURBO_EN at very precise intervals, this value is set to a large value. In contrast, if precision of position setting is not so high, this value is set to a small value. In the embodiment of the present invention, this value is set to 16, because it is believed that with such precision, it is possible to sufficiently distinguish performance differences of iterative decoding by the turbo decoder. However, this value can be replaced with 32 or 64 during design.

Even though the HARQ controller 30 uses more than 16 setting positions, it is not practically possible to more precisely distinguish performance differences of iterative decoding.

FIG. 8 is a timing diagram illustrating an example of a relationship between a turbo decoding-done signal PDCH_TURBO_DONE and its consecutive turbo decoder enable signal PDCH_TURBO_EN according to an embodiment of the present invention. With reference to FIG. 8, a description will now be made of a function between the turbo decoding-done signal PDCH_TURBO_DONE and a turbo decoder enable signal PDCH_TURBO_EN.

As illustrated in FIG. 8, a relationship between a turbo decoding-done signal PDCH_TURBO_DONE and its consecutive turbo decoder enable signal PDCH_TURBO_EN can be roughly classified into two cases. In a first case, the turbo decoding-done signal PDCH_TURBO_DONE and its consecutive turbo decoder enable signal PDCH_TURBO_EN are generated in different slots as shown by two upper waveforms in FIG. 8. In a second case, the turbo decoding-done signal PDCH_TURBO_DONE and its consecutive turbo decoder enable signal PDCH_TURBO_EN are generated in the same slot as shown by the other 3 waveforms in FIG. 8.

The first case will now be described. In the first case, after a $k^{th}$ turbo decoding-done signal PDCH_TURBO_DONE is generated in a current slot, a $(k+1)^{th}$ turbo decoder enable signal PDCH_TURBO_EN is generated in the next slot. In this case, a size EP_SIZE of an encoder packet is small or a channel condition is good. When a size EP_SIZE of an encoder packet is small or a channel condition is good, the fast turbo decoder 40 can rapidly complete turbo decoding. Thus, the fast turbo decoder 40 waits to receive information on a size of an encoder packet received from the HARQ controller 30 in the next slot. This is because if there is no information on a size of a new encoder packet, the fast turbo decoder 40 cannot perform decoding. The most extreme case of a second upper case of FIG. 8, the turbo decoding-done signal PDCH_TURBO_DONE is generated at a boundary of a $(k+1)^{th}$ slot.

Next, a description will be made of the second case in which the turbo decoding-done signal PDCH_TURBO_DONE and its consecutive turbo decoder enable signal PDCH_TURBO_EN are generated in the same slot. The second case most frequently occurs in an actual apparatus. For ACK/NAK_DELAY=2 slots, the HARQ controller 30 sets a generation position of a $(k+1)^{th}$ turbo decoder enable signal DPCH_TURBO_EN to a rear part of the slot in order to artificially increase a turbo decoding time, and this case also corresponds to the second case. In an extreme case, the HARQ controller 30 outputs a $(k+1)^{th}$ turbo decoder enable signal PDCH_TURBO_EN and outputs a $(k+1)^{th}$ turbo decoding-done signal PDCH_TURBO_DONE in the slot. In this case, the HARQ controller 30 generates the turbo decoder enable signal PDCH_TURBO_EN in the next slot. Accordingly, there is a case where there are three control signals transmitted from the HARQ controller 30 to the fast turbo decoder 40 within one slot. This case is shown by a fourth waveform of FIG. 8. In the case of the last waveform of FIG. 8, if the HARQ controller 30 desires to artificially increase a turbo decoding time for 2-slot ACK/NAK_DELAY, it sets a generation position of a $(k+1)^{th}$ turbo decoder enable signal PDCH_TURBO_EN to a rear part of a $(k+1)^{th}$ slot irrespective of whether a $k^{th}$ turbo decoding-done signal is output or not. In this case, the (k+1) turbo decoder enable signal PDCH_TURBO_EN is output at a boundary of the $(k+1)^{th}$ slot after the fast turbo decoder 40 performs decoding.

The foregoing description made in connection with FIG. 8 can be summarized into the following two rules.

(1) If there are two consecutive encoder packets to be decoded, a time t_TB_GAP between a $k^{th}$ turbo decoding-done signal PDCH_TURBO_DONE and a $(k+1)^{th}$ turbo decoder enable signal PDCH_TURBO_EN is shorter than 1.25 msec in most cases as illustrated in FIG. 8.

(2) A $k^{th}$ turbo decoding-done signal PDCH_TURBO_DONE, a $(k+1)^{th}$ turbo decoder enable signal PDCH_TURBO_EN, and a $(k+1)^{th}$ turbo decoding-done signal PDCH_TURBO_DONE can coexist in one slot.

A maximum decoding time and a data transferring time can be determined by combining FIGS. 6, 7 and 8. A description of the maximum decoding time and the data transferring time will be made below.

For example, if a $k^{th}$ demodulation-done signal PDCH_DEMOD_DONE is generated, a $k^{th}$ turbo decoder enable signal PDCH_TURBO_EN must be generated, and they exist within one slot. A maximum of 2 slots are required from a time when the $k^{th}$ turbo decoder enable signal PDCH_TURBO_EN is generated to a time when the fast turbo decoder 40 generates a $k^{th}$ turbo decoding-done signal PDCH_TURBO_DONE in response to the $k^{th}$ turbo decoder enable signal PDCH_TURBO_EN. Therefore, the total required time is equal to or shorter than 2 slots, i.e., 2.5 msec, from the slot where the $k^{th}$ turbo demodulation-done signal PDCH_DEMOD_DONE is generated. Possible cases occurring in this period can be determined by combining FIGS. 6 and 7. Since a time required for new turbo decoding from the $k^{th}$ turbo decoding-done signal PDCH_TURBO_DONE becomes a minimum of 2 slots, a new turbo decoder enable signal PDCH_TURBO_EN can be generated within a maximum of 3 slots from the $k^{th}$ turbo decoder enable signal PDCH_TURBO_EN.

Next, a description will be made of a structure of an output buffer and an output buffer controller according to an embodiment of the present invention.

Figure 9:
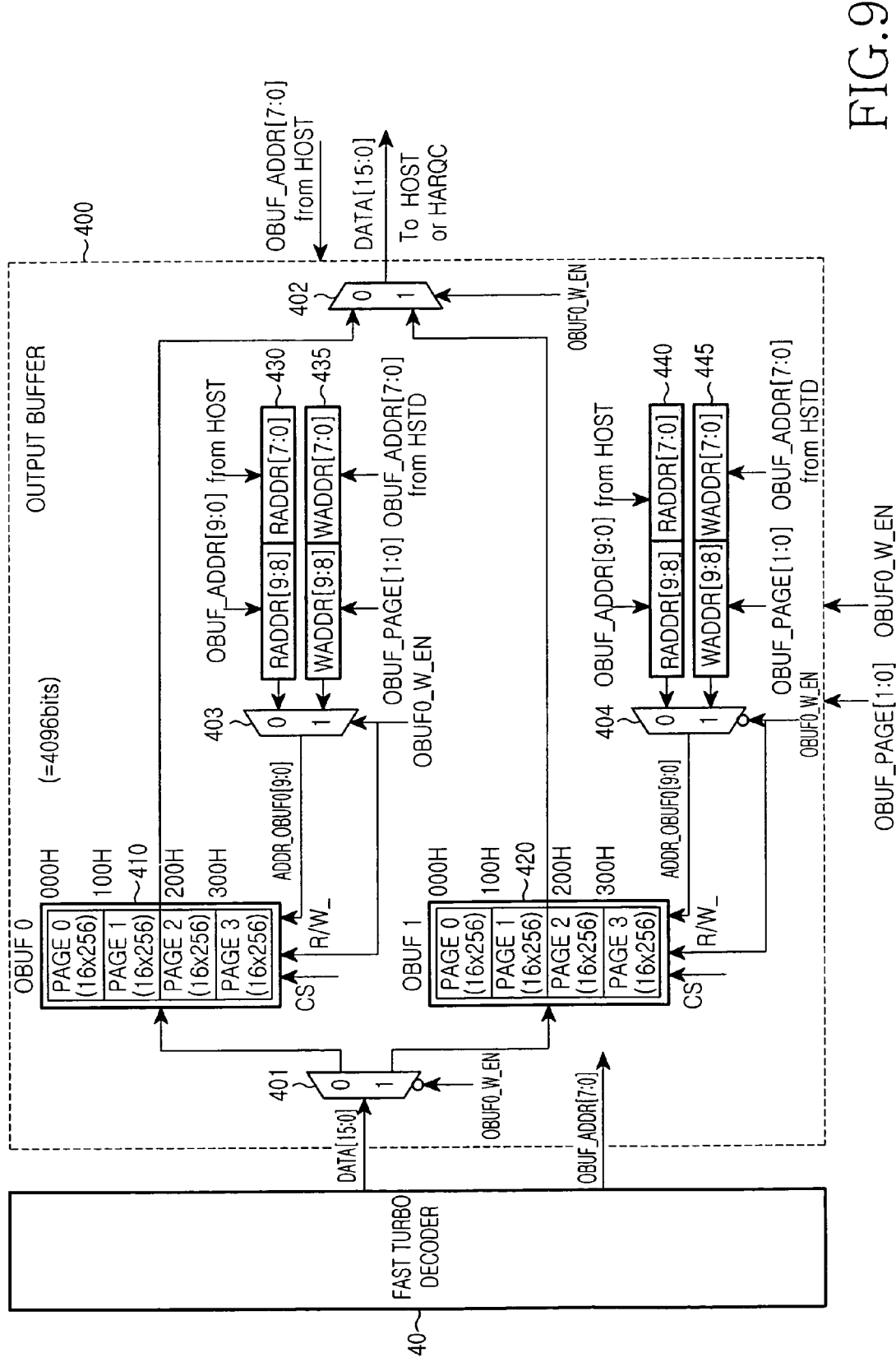
FIG. 9 is a simplified block diagram illustrating a structure of an output buffer according to an embodiment of the present invention.

FIG. 9 is a simplified block diagram illustrating a structure of an output buffer according to an embodiment of the present invention. Structure and operation of the output buffer according to the present invention will now be described in detail with reference to FIG. 9.

Among the signals output from the HARQ controller 30, a buffer page select signal OBUF_PAGE[1:0] and a first buffer write enable signal OBUF0_W_EN are output to the output buffer 400 as illustrated in FIG. 5. After completion of turbo decoding, the fast turbo decoder 40 outputs decoded data DATA[15:0] and at the same time, outputs an address OBUF_ADDR where the decoded data is to be stored. The data output from the fast turbo decoder 40 is input to a demultiplexer 401. The demultiplexer 401 has a write enable input terminal for selecting a first buffer OBUF#0 410 or a second buffer OBUF#1 420 and writing the decoded data in the selected buffer. A signal input to the write enable input terminal is a first buffer write enable signal OBUF0_W_EN. The first buffer write enable signal OBUF0_W_EN has a level of 'high' or 'low'. For example, if the first buffer write enable signal OBUF0_W_EN in a 'high' state is input to the write enable input terminal of the demultiplexer 401, the demultiplexer 401 outputs its input data to the first buffer 410. In contrast, if the first buffer write enable signal OBUF0_W_EN in a 'low' state is input to the write enable input terminal of the demultiplexer 401, the demultiplexer 401 outputs its input data to the second buffer 420.

An actual buffer of the output buffer is comprised of the first buffer 410 and the second buffer 420. The first buffer 410 and the second buffer 420 have the same size and the same internal structure. In the embodiment of the present invention, the first buffer 410 and the second buffer 420 each comprise 4 pages of PAGE#0, PAGE#1, PAGE#2 and PAGE#3, and the size of each page is 16×256. The first buffer 410 and the second buffer 420 both have a chip select signal input terminal CS and a read/write signal input terminal R/W. In addition, the first buffer 410 and the second buffer 420 have a data read/write address input terminal ADDR_OBUF0[9:0] and a data read/write address input terminal ADDR_OBUF1[9:0], respectively.

To the read/write signal input terminals R/W of the first buffer 410 and the second buffer 420, is input the first buffer write enable signal OBUF0_W_EN which is also input to the write enable input terminal of the demultiplexer 401. Output terminals of the first buffer 410 and the second buffer 420 are connected to input terminals of a first multiplexer 402. The first multiplexer 402 selects one of outputs of the first buffer 410 and the second buffer 420 based on the first buffer write enable signal OBUF0_W_EN.

The address input terminal of the first buffer 410 is connected to an output terminal of a second multiplexer 403, and receives a read/write address signal ADDR_OBUF0[9:0] for the first buffer 410. Similarly, the address input terminal of the second buffer 420 is connected to an output terminal of a third multiplexer 404, and receives a read/write address signal ADDR_OBUF1[9:0] for the second buffer 420.

The second multiplexer 403 receives a first buffer read address signal OBUF_RADDR[9:0] comprised of a total of 10 bits of RADDR0[9:8] and RADDR0[7:0] from the processor 50. That is, the processor 50 outputs a read address signal at once, and among the 10 bits, 2 high bits represent a corresponding page of the output buffer. In addition, the second multiplexer 403 receives a first buffer write address signal OBUF_WADDR[9:0] comprised of WADDR0[9:8] and WADDR0[7:0] from the fast turbo decoder 40. Such signals are selectively output based on the first buffer write enable signal OBUF0_W_EN applied to the second multiplexer 403.

The third multiplexer 404 receives a second buffer read address signal OBUF_RADDR[9:0] comprised of RADDR1[9:8] and RADDR1[7:0] from the processor 50. In addition, the third multiplexer 404 receives a second buffer write address signal OBUF_WADDR[9:0] comprised of WADDR1[9:8] and WADDR1[7:0] from the fast turbo decoder 40. Such signals are selectively output based on the first buffer write enable signal OBUF0_W_EN applied to the third multiplexer 404. The third multiplexer 404 and the second multiplexer 403 receive the same signal. Therefore, a select signal input terminal of one of the two multiplexers should comprise an inverse terminal. In the embodiment of the present invention, a select signal input terminal of the third multiplexer 404 comprises an inverse terminal.

In operation, decoded data DATA[15:0] and an output buffer address signal OBUF_ADDR[7:0] are received from the fast turbo decoder 40. A buffer page select signal OBUF_PAGE[1:0] designating a page where the data decoded by the fast turbo decoder 40 is stored, and a first output buffer write enable signal OBUF0_W_EN are applied to the output buffer 400 from the output buffer controller 300 in the HARQ controller 30. The decoded data DATA[15:0] is input to the demultiplexer 401, and selects the first buffer 410 or the second buffer 420 based on the first output buffer write enable signal OBUF0_W_EN and outputs the decoded data to the selected buffer.

A chip select signal CS selects the first buffer 410 or the second buffer 420 according to the select signal and enables the selected buffer. Based on a first output buffer write signal ADDR_OBUF0[9:0] or a second output buffer write signal ADDR_OBUF1[9:0] output from the second multiplexer 403 or the third multiplexer 404, the decoded data is written in a corresponding address of the page.

When given data is written through the above process and the processor 50 reads out the data, a first buffer read address signal OBUF_RADDR[9:0] is input to the second multiplexer 403 or a second buffer read address signal OBUF_RADDR[9:0] is input to the third multiplexer 404. At this point, the first output buffer write enable signal OBUF0_W_EN is input to the output buffer 400 from the output buffer controller 300. Based on this, a corresponding buffer is selected, and data is output from the selected buffer. The data output from the first buffer 410 or the second buffer 420 is input to the first multiplexer 402, and the first multiplexer 402 selectively outputs the decoded data based on the first output buffer write enable signal OBUF0_W_EN.

Figure 10:
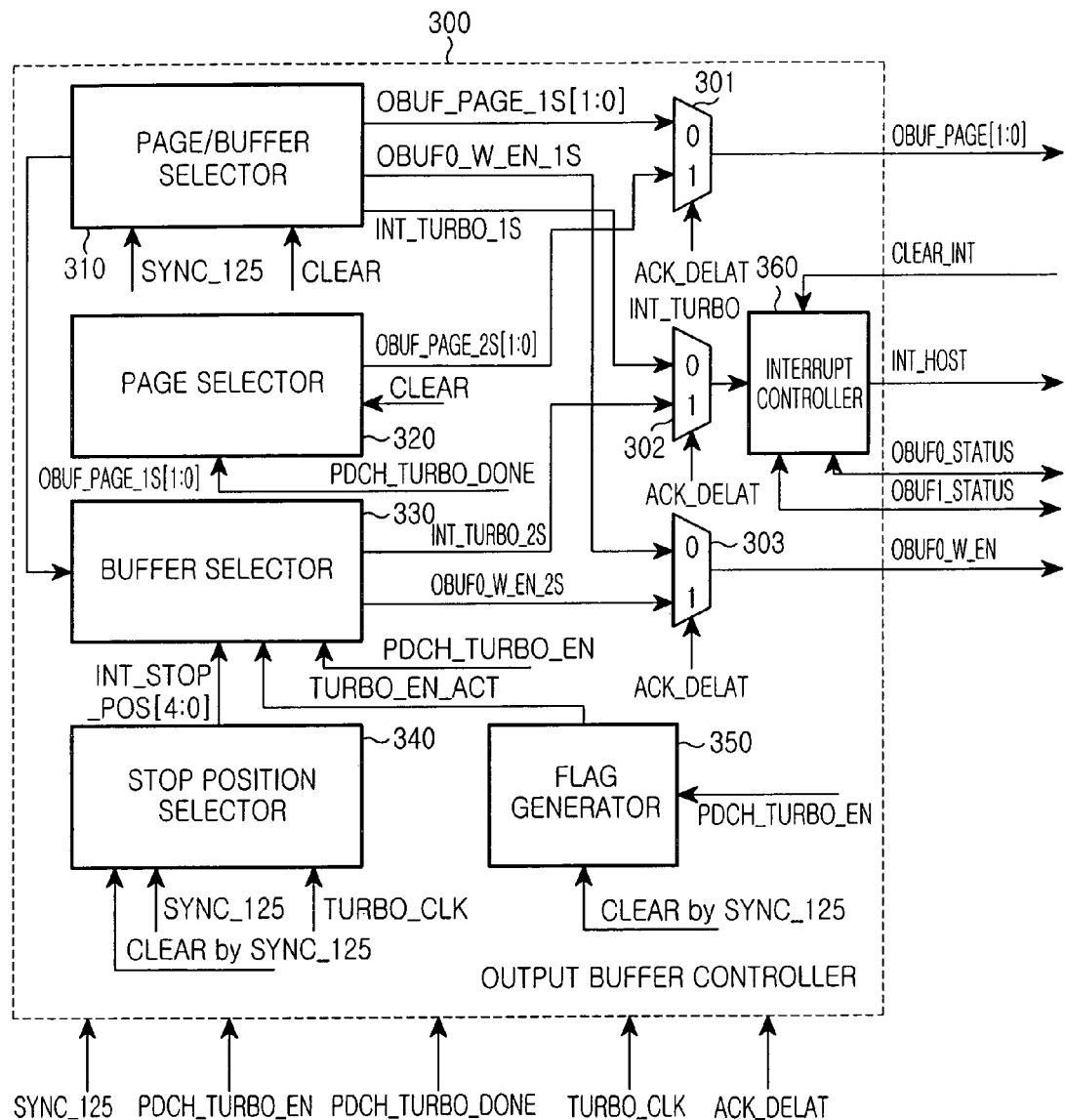
FIG. 10 is a detailed block diagram illustrating a structure of an output buffer controller according to an embodiment of the present invention.

FIG. 10 is a detailed block diagram illustrating a structure of an output buffer controller according to an embodiment of the present invention. Structure and operation of the output buffer controller according to the present invention will now be described with reference to FIG. 10.

In the embodiment of the present invention, it is assumed that an EV-DV system supports 1-slot ACK/NAK_DELAY or 2-slot ACK/NAK_DELAY. Therefore, the output buffer controller 300 according to an embodiment of the present invention is designed so that the EV-DV system can support both 1-slot ACK/NAK_DELAY and 2-slot ACK/NAK_DELAY. In FIG. 10, a block used for 1-slot ACK/NAK_DELAY includes a page/buffer selector 310, while blocks used for 2-slot ACK/NAK_DELAY include a page selector 320, a buffer selector 330, and a stop position selector 340. Other blocks 350, 360, 301, 302 and 303 are common blocks. Operation and structure of the blocks will now be described.

First, the page/buffer selector 310 will be described. The page/buffer selector 310 outputs a buffer select signal and a page signal in order to write turbo-decoded data in an output buffer in a 1-slot ACK/NAK_DELAY mode. The buffer select signal OBUF_W_EN_1S output from the page/buffer selector 310 is a signal for selecting one of the first buffer 410 and the second buffer 420. The page select signal OBUF_PAGE_1S[1:0] output from the page/buffer selector 310 is a signal for selecting a page of the selected buffer. In addition, the page/buffer selector 310 generates an interrupt signal INT_TURBO_1S for transmitting data every 5 msec. In order to generate the interrupt signal, the page/buffer selector 310 uses a system synchronization signal SYNC_125 as an input signal, and is cleared once during initialization of the fast turbo decoder 40, and thereafter, continuously operated by the SYNC_125. Detailed structure and operation of the page/buffer selector 310 will now be described with reference to FIG. 11.

Figure 11:
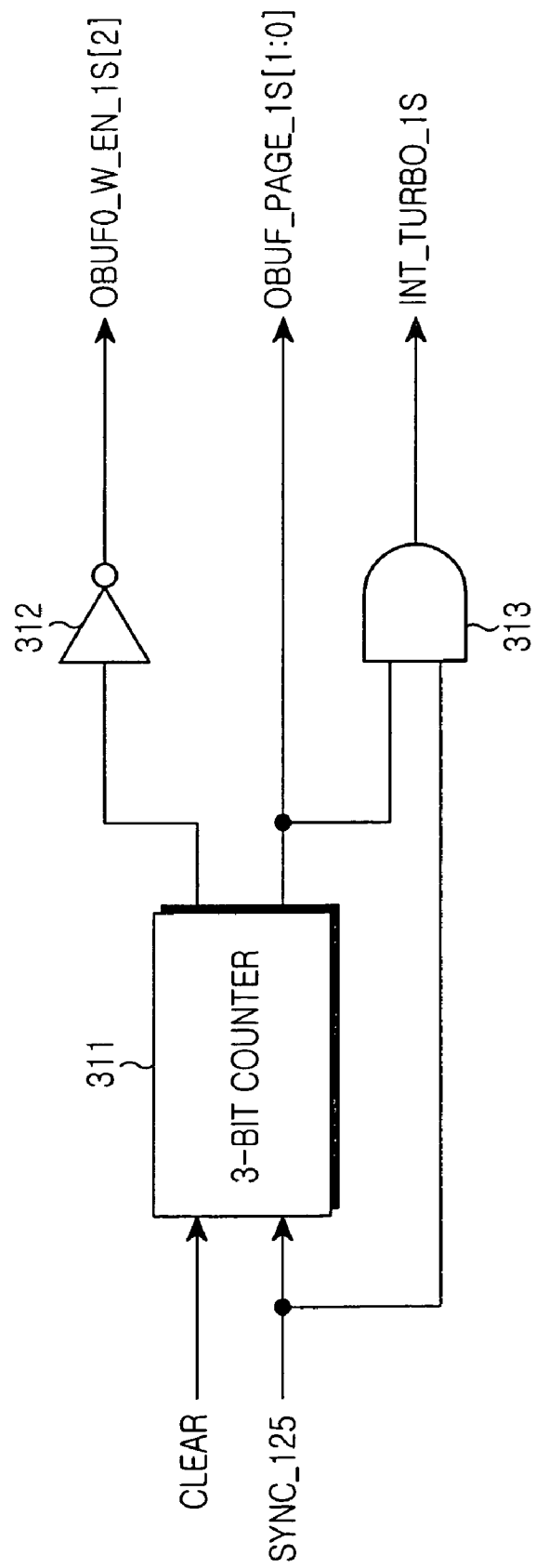
FIG. 11 is a block diagram illustrating a detailed structure of the page/buffer selector according to an embodiment of the present invention.

FIG. 11 is a block diagram illustrating a detailed structure of the page/buffer selector according to an embodiment of the present invention. The page/buffer selector 310 receives a clear signal which is input once during initialization of the fast turbo decoder 40. In addition, the page/buffer selector 310 receives the system synchronization signal SYNC_125. The clear signal and the system synchronization signal are input to a 3-bit counter 311. The 3-bit counter 311 clears (or initializes) its count value upon receiving the clear signal, then counts the system synchronization signal received, thereafter outputs an inverted 1-slot ACK/NAK_DELAY-based buffer write enable signal OBUF0_2_EN_1S[2] according to the count result, and outputs a 1-slot ACK/NAK_DELAY-based buffer page select signal OBUF_PAGE_1S[1:0]. The inverted signal is converted into a normal signal by an inverter 312, and the page select signal is output directly. The page select signal and the system synchronization signal are input to an AND gate 313, and the AND gate 313 performs a logical AND operation on its input signals and generates a 1-slot ACK/NAK_DELAY-based interrupt signal INT_TURBO_1S.

Turning back to FIG. 10, a description will be made of the page selector 320. As mentioned above, the page selector 320 is used in a 2-slot ACK/NAK_DELAY mode. The page selector 320 generates a page select signal OBUF_PAGE_2S[1:0] for setting a page where turbo-decoded data is to be written when the turbo-decoded data is stored in one of the first buffer 410 and the second buffer 420. The page selector 320 can be comprised of a 2-bit counter. In this case, the 2-bit counter receives a packet data channel turbo decoding-done signal PDCH_TURBO_DONE. The page selector 320 is cleared during initialization of the fast turbo decoder 40, and thereafter, is cleared in synchronism with a signal INT_TURBO_2S output from the buffer selector 330.

Next, the buffer selector 330 will be described. The buffer selector 330 is used in the 2-slot ACK/NAK_DELAY mode. The buffer selector 330 generates a buffer select signal OBUF_W_EN_2S for selecting one of the first buffer 410 and the second buffer 420 in order to store turbo-decoded data. Since the buffer select signal OBUF_W_EN_2S is used as a multiplexer select signal for the output buffer 400, it has a level of 'high' or 'low'. In addition, the buffer selector 330 generates an interrupt signal INT_TURBO_2S for transmitting data at every 5-msec boundary and its vicinity based on the 2-slow ACK/NAK_DELAY. A detailed structure of the buffer selector 330 will now be described with reference to FIG. 12.

Figure 12:
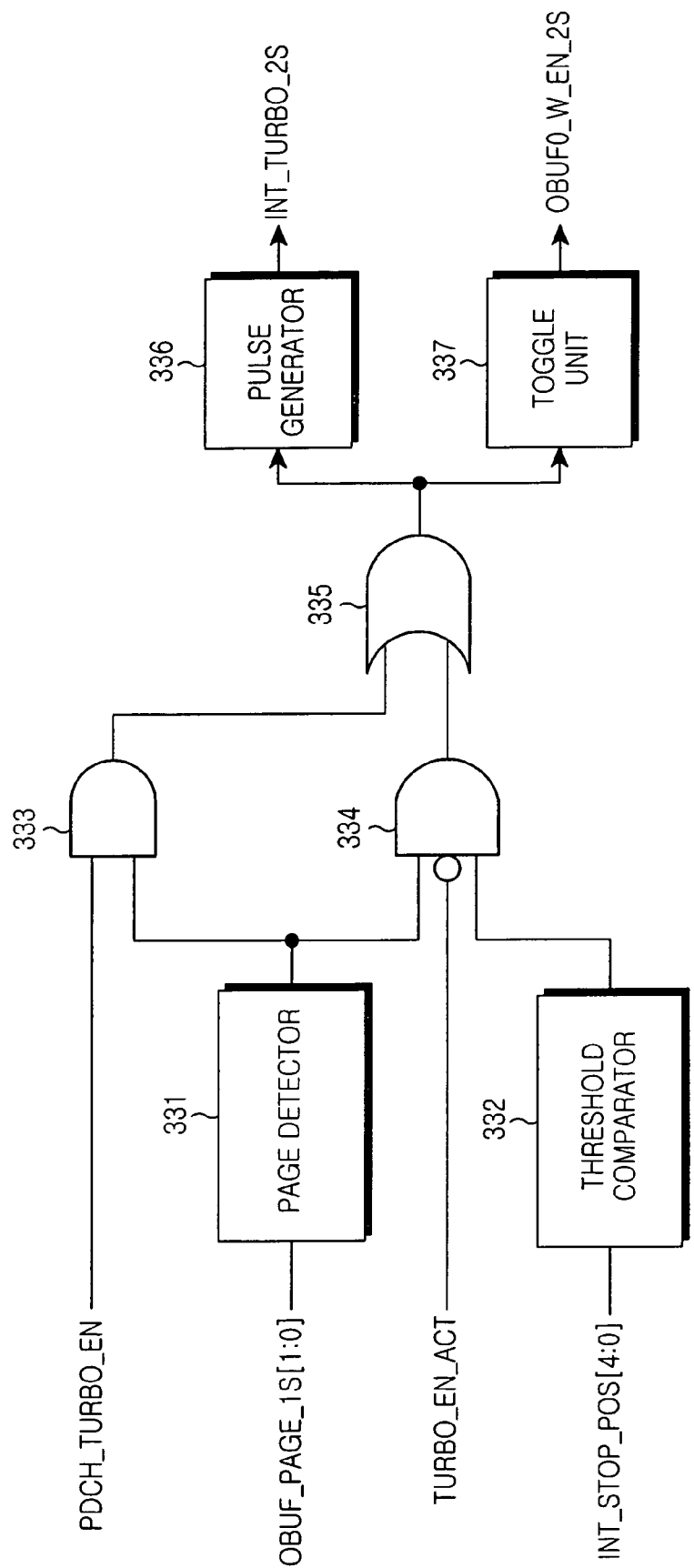
FIG. 12 is a block diagram illustrating a detailed structure of the buffer selector according to an embodiment of the present invention.

FIG. 12 is a block diagram illustrating a detailed structure of the buffer selector 330 according to an embodiment of the present invention. The buffer selector 330 receives 4 kinds of input signals. A description will be made of the 4 kinds of input signals.

(1) INT_STOP_POS[4:0]: It is a value providing a generation position of INT_STOP. That is, this value represents a time limit where position setting of a turbo decoder enable signal PDCH_TURBO_EN cannot occur, and the PDCH_TURBO_EN should always have a smaller value than this INT_STOP_POS. Therefore, INT_STOP_POS is used to detect a situation where PDCH_TURBO_EN can be no longer generated in the corresponding slot, by comparing this value with the PDCH_TURBO_EN.

(2) TURBO_EN_ACT: It is a signal indicating whether a turbo decoder enable signal PDCH_TURBO_EN is generated for one 1.25-msec slot, and has a value of '0' if there is no turbo decoder enable signal PDCH_TURBO_EN within one slot.

(3) Turbo decoder enable signal (PDCH_TURBO_EN)

(4) 1-slot ACK/NAK_DELAY-based buffer page signal (OBUF_PAGE_1S[1:0]: The 1-slot ACK/NAK_DELAY-based buffer page signal is a signal generated by ANDing the system synchronization signal SYNC_125 and the output signal of the 3-bit counter 311 as described in conjunction with FIG. 11. This signal is used for detecting page switching information. The detection information will be described in detail with reference to FIG. 12.

The 1-slot ACK/NAK_DELAY-based buffer page signal OBUF_PAGE_1S[1:0] is input to a page detector 331. The page detector 331 outputs a value of '1' if the 1-slot ACK/NAK_DELAY-based buffer page signal OBUF_PAGE_1S[1:0] indicates '0 page', and otherwise, the page detector 331 outputs a value of '0'. The INT_STOP_POS[4:0] is input to a threshold comparator 332. Here, the INT_STOP_POS[4:0] is a value indicating a time limit where position setting of the turbo decoder enable signal PDCH_TURBO_EN cannot occur, and the PDCH_TURBO_EN should always have a smaller value than the INT_STOP_POS[4:0]. Therefore, the INT_STOP_POS[4:0] is a signal used to detect a situation where PDCH_TURBO_EN can be no longer generated in the corresponding slot, by comparing this value with the PDCH_TURBO_EN. The threshold comparator 332 outputs a value of '1' if an INT_STOP_POS[4:0] value is larger than a predetermined threshold M, and otherwise, the threshold comparator 332 outputs a value of '0'. An output signal of the page selector 331 and the turbo decoder enable signal PDCH_TURBO_EN are input to a first AND gate 333, and the first AND gate 333 performs a logical AND operation on its two input signals. A second AND gate 334 receives an inverted value of TURBO_EN_ACT and output values of the page detector 331 and the threshold comparator 332, and performs a logical AND operation on its input values.

Output signals of the first AND gate 333 and the second AND gate 334 are input to an OR gate 335, and the OR gate 335 performs a logical Or operation on its two input signals. An output signal of the OR gate 335 is divided into two signals: one of the two signals is input to a pulse generator 336 and the other signal is input to a toggle unit 337. The pulse generator 336 generates one pulse signal INT_TURBO_2S based on an signal output from the OR gate 335, and the toggle unit 337 outputs a 2-slot ACK/NAK_DELAY-based buffer write enable signal OBUF_W_EN_2S depending on an output of the OR gate 335.

Summarizing, the pulse signal INT_TURBO_2S and the 2-slot ACK/NAK_DELAY-based buffer write enable signal OBUF_W_EN_2S, output signals of the buffer selector 330 of FIG. 12, are generated when the following conditions are satisfied. First, these signals are generated when '0 page' is detected by the 1-slot ACK/NAK_DELAY-based buffer write enable signal and the turbo decoder enable signal PDCH_TURBO_EN is generated. In this case, an output of the first AND gate 333 becomes '1'. Second, these signals are generated when '0 page' is detected by the 1-slot ACK/NAK_DELAY-based buffer write enable signal and INT_STOP_POS[4:0] is larger than a preset threshold in a state where the turbo decoder enable signal PDCH_TURBO_EN is not generated. In this case, an output of the second AND gate 334 becomes '1'.

That is, in order to detect 5 msec, '0 page' is used as an indicator, and under this condition, the buffer selector 330 determines a report operation depending on whether the turbo decoder enable signal PDCH_TURBO_EN is generated. If the turbo decoder enable signal PDCH_TURBO_EN is generated, switchover between interrupt and buffer is performed in an instant. However, if the turbo decoder enable signal PDCH_TURBO_EN is not generated, the buffer selector 330 waits until a position of a threshold M (=maximum position, e.g., M=16) which is a possible maximum delay position of the turbo decoder enable signal PDCH_TURBO_EN. Thereafter, the moment the threshold is exceeded, the buffer selector 330 switches the buffer by compulsory. Here, an event where the turbo decoder enable signal PDSH_TURBO_EN is generated and an event where the buffer selector 330 waits until the position of the threshold, the maximum delay position, by the INT_STOP_POS[4:0], are mutually exclusive. Therefore, only one of the two events occurs at a circuit time. A TURBO_EN_ACT flag uses this principle.

The stop position selector (or INT_STOP position selector) 340 provides position information of INT_STOP that can be randomly set within one slot. The stop position selector 340 receives a system synchronization signal SYNC_125, a turbo clock TURBO_CLK, and a clear signal CLEAR. The clear signal is cleared by every system synchronization signal SYNC_125, and performs 31 counts in a 1.25-msec period. Here, 31 is a randomly given value, and this value can be can be set to a different value when a more precise PDCH_TURBO_EN gap is required by a designer during implementation. In addition, the stop position selector 340 can be comprised of a counter that performs as many counts as a predetermined number of bits, and counts the number of bits of 0 to M in one 1.25-msec slot. Here, the INT_STOP has a value of 0 to 31 that can be designated by INT_STOP_POS[4:0], and in this case, M is a value determined by MAC. Therefore, it means that in INT_STOP_POS larger than M, no more turbo decoding can occur. The INT_STOP_POS[4:0] signal output from the stop position selector 340 can be used by the HARQ controller 30 in setting INT_STOP to a particular position.

A flag generator 350 determines whether a turbo decoder enable signal is generated in a slot, and outputs an active flag signal TURBO_EN_ACT of the fast turbo decoder 40. The flag generator 350 receives a system clock SYNC_125 and a turbo decoder enable signal PDCH_TURBO_EN of a packet data channel. The flag generator 350 is cleared by the system clock SYNC_125, and outputs a flag signal of '1' if the active flag signal TURBO_EN_ACT of the fast turbo decoder 40 is generated even once in the 1.25-msec period. The flag generator 350 can be comprised of a flip-flop, and receives the system clock SYNC_125 as a clear signal. If an input signal '1' is received as a turbo decoder enable signal PDCH_TURBO_EN of a packet data channel, the flag generator 350 outputs the input signal '1' as an active flag signal TURBO_EN_ACT of the fast turbo decoder 40.

An interrupt controller 360 receives a 5-msec interrupt generated in the 1-slot ACT/NAK_DELAY and 2-slot ACK/NAK_DELAY modes, and delivers the received interrupt to the HARQ controller 30. The interrupt controller 360 generates an interrupt only when any encoder packet decoded without an error exists in the output buffer (OBUF0 or OBUF1) 400 that was in a write mode for 5 msec. The interrupt controller 360 will now be described in detail with reference to FIG. 13.

Figure 13:
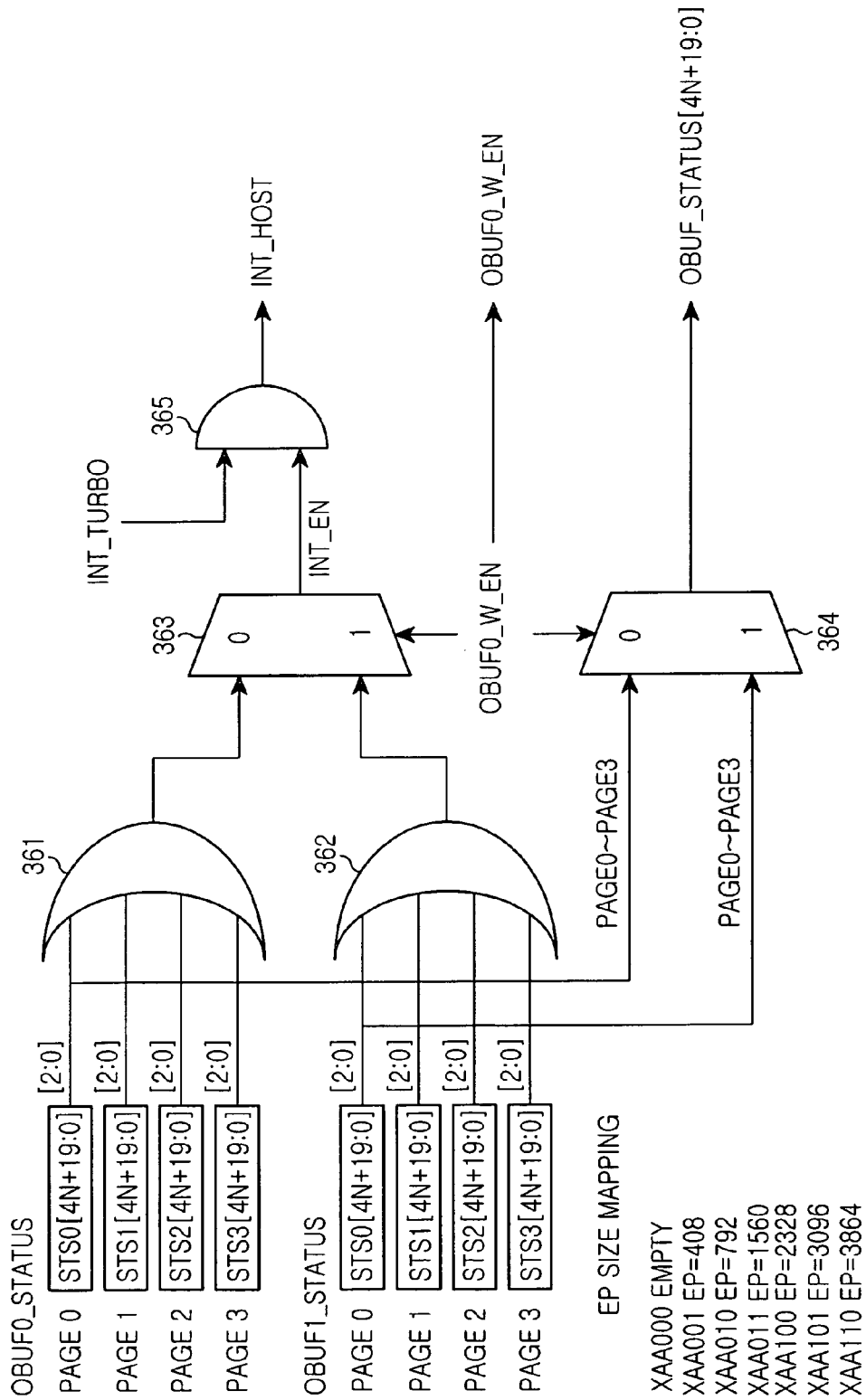
FIG. 13 is a block diagram illustrating a detailed structure of the interrupt controller according to an embodiment of the present invention.

FIG. 13 is a block diagram illustrating a detailed structure of the interrupt controller according to an embodiment of the present invention. Referring to FIG. 13, the interrupt controller 360 includes two OR gates 361 and 362, two multiplexers 363 and 364, and one AND gate 365. The first OR gate 361 receives each page status information of the first output buffer 410 as its input signals, and the second OR gate 362 receives each page status information of the second output buffer 420 as its input signals. In the embodiment of the present invention, since each output buffer is comprised of 4 pages as illustrated in FIG. 9, the first OR gate 361 and the second OR gate 362 each receive 4 input signals. The first and second output buffers 410 and 420 generate output buffer status signals OBUF0_STATUS and OBUF1_STATUS, respectively. The first and second output buffers 410 and 420 output an 'Empty' signal as status information when there is no data. If the 'Empty' signal is received, the interrupt controller 360 does not send an interrupt signal to the HARQ controller 30 even though INT_TURBO_1S or INT_TURBO_2S is generated. That is, the interrupt controller 360 disables an interrupt signal INT_HOST being transmitted to the processor 50.

Output signals of the first and second OR gates 361 and 362 are input to the first multiplexer 363, and the first multiplexer 363 selects one of the output signals based on the first output buffer write enable signal OBUF0_W_EN. Also, the second multiplexer 364 receives the status signals OBUF0_STATUS and OBUF1_STATUS from the first and second output buffers 410 and 420, and outputs one of the two status signals as an output buffer status signal OBUF_STATUS[4N+19:0] based on the first output buffer write enable signal OBUF0_W_EN. The AND gate 365, receiving an output signal of the first multiplexer 363 and an INT_TURBO signal, ANDs the two input signals, and outputs an interrupt signal INT_HOST to the processor 50.

Through this, the HARQ controller 30 writes an EP_SIZE_TURBO value in this register in a manner shown in Table 2 below each time the status signals OBUF0_STATUS and OBUF1_STATUS of the first and second output buffers and the turbo decoder enable signal PDCH_TURBO_EN of a packet data channel are generated.

TABLE 2

| | CODE | | | | | | | |
|---|---|---|---|---|---|---|---|---|
| | 000 | 001 | 010 | 011 | 100 | 101 | 110 | 111 |
| EP size | Empty | 408 | 792 | 1560 | 2328 | 3096 | 3864 | RVD |

In addition, the interrupt controller 360 provides the processor 50 with a processor interrupt signal INT_HOST and the status signals OBUF0_STATUS and OBUF1_STATUS, set to a read mode, of the first and second output buffers. At this time, the interrupt controller 360 delivers the output buffer status signal OBUF_STATUS[4N+19:0] output from the second multiplexer 364 as well. In the output buffer status signal OBUF_STATUS[4N+19:0], 'N' denotes the number of information bits for notifying time information of a received packet to the processor 50, and 4N bits are assigned considering that a total of 4 packets are simultaneously transmitted to the processor 50. In addition, the interrupt controller 360 can transmit various parameters required by an upper layer, observed in a receiver, all together. For example, the interrupt controller 360 can transmit only the above parameters in a normal mode, and transmit various parameters observed in a receiver all together to an upper layer in a test mode or an observation mode. Therefore, in the present invention, parameters delivered to the upper layer are not limited to the above-stated parameters.

The processor 50 then receives the values, determines a size of data stored in the output buffer set to a read mode depending on the received values, and reads data having a set size from a corresponding page. Specifically describing, the data size becomes a decoded EP block size, a retransmission channel ID, and a system time SYS_TIME.

A size of an encoder packet stored in each page is determined by the codes shown in Table 2. Therefore, since '000b' indicates that there is no data in a corresponding page, the processor 50 can skip the corresponding page. The processor 50 generates a read address from the output buffer status signal OBUF_STATUS and each page's data size, and accesses the output buffer using the generated read address.

Figure 14:
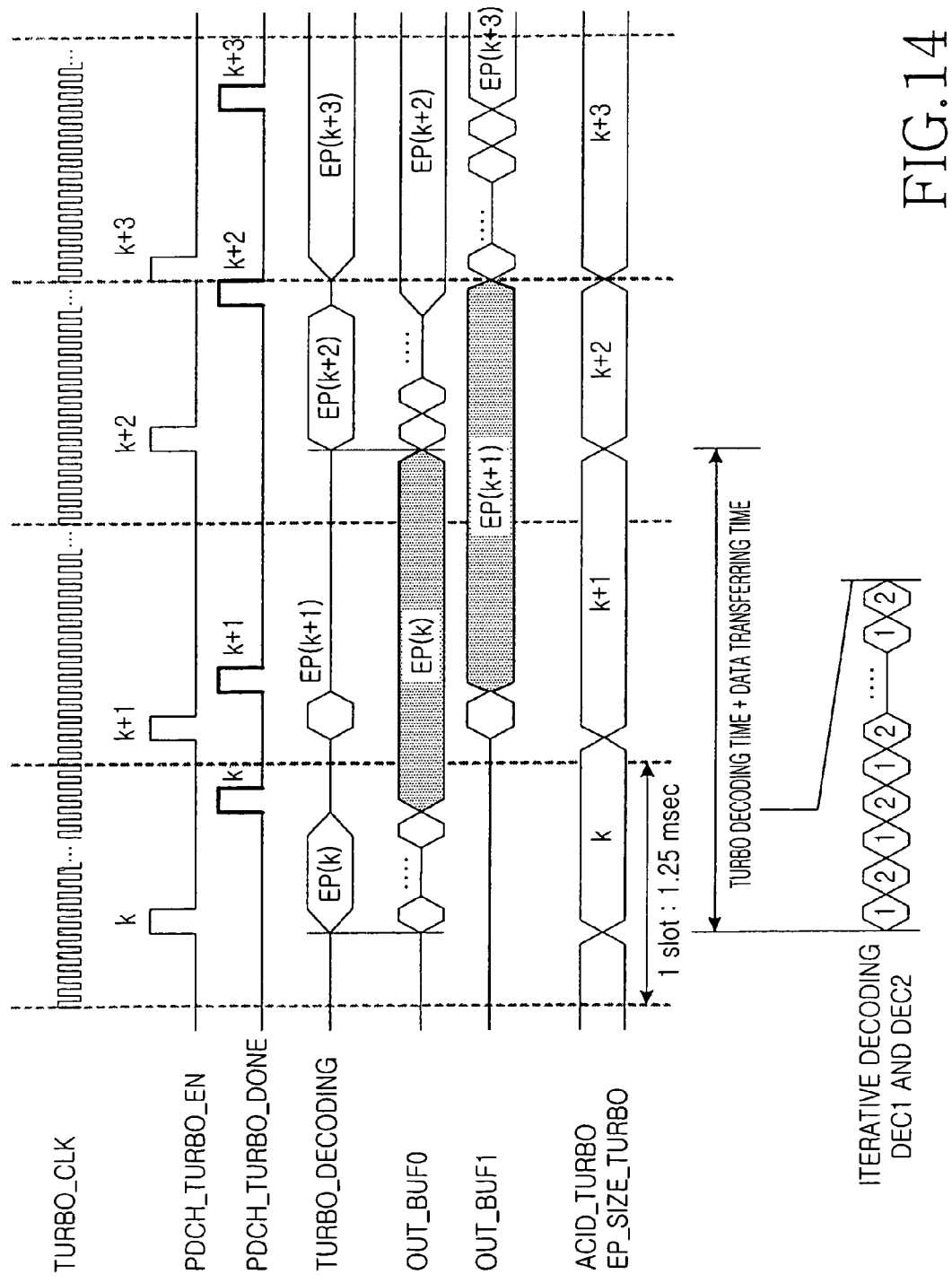
FIG. 14 is a timing diagram of signals output from the output buffer controller in a 1-slot ACK/NAK_DELAY mode according to an embodiment of the present invention.

FIG. 14 is a timing diagram of signals output from the output buffer controller in a 1-slot ACK/NAK_DELAY mode according to an embodiment of the present invention. With reference to FIG. 14, a detailed description will now be made of timings of signals output from the output buffer controller in the 1-slot ACK/NAK_DELAY mode according to the embodiment of the present invention.

As illustrated in FIG. 14, the fast turbo decoder 40 uses a turbo decoder clock TURBO_CLK as a system clock, and also uses a turbo decoder enable signal PDCH_TURBO_EN of a packet data channel as the system clock. The turbo decoder enable signal PDCH_TURBO_EN of a packet data channel received from the HARQ controller 30 can be continuously generated every slot or discontinuously generated according to how a base station schedules the packet data channel. A relationship between the turbo decoder enable signal PDCH_TURBO_EN of a packet data channel and the turbo decoding-done signal PDCH_TURBO_DONE indicating completion of a decoding operation of the fast turbo decoder 40, illustrated in FIG. 14, shows typical examples available in FIG. 8. Particularly, the relationship shows the worst case in which a new subpacket is continuously received every 1.25-msec slot and thus, the HARQ controller 30 continuously generates the turbo decoder enable signal PDCH_TURBO_EN of a packet data channel every slot. In FIG. 14, it is assumed that only the double buffer structure is used in which two buffers are included, and the above-stated method of transmitting 4 decoded encoder packets all together is not considered.

A decoding operation of the fast turbo decoder 40 is performed between a $k^{th}$ turbo decoder enable signal PDCH_TURBO_EN(k) of a packet data channel and a $k^{th}$ turbo decoding-done signal PDCH_TURBO_DONE(k) in one slot, and is not performed between the $k^{th}$ turbo decoding-done signal PDCH_TURBO_DONE(k) and its consecutive (k+1)$^{th}$ turbo decoder enable signal PDCH_TURBO_EN(k+1) of a packet data channel. However, even though the decoding operation of the fast turbo decoder 40 is suspended, an operation of an output buffer in the fast turbo decoder 40 is continuously performed, and the operation can be performed for a maximum of 2 slots (2.5 msec) from the slot where the $k^{th}$ turbo decoder enable signal PDCH_TURBO_EN(k) of a packet data channel is generated. That is, a double output buffer is used. It is noted in FIG. 14 that a decoding result of a (k+1)$^{th}$ encoder packet EP(k+1) is maintained until a (k+3)$^{th}$ slot.

Since the fast turbo decoder 40 performs iterative decoding for a turbo decoding time, the fast turbo decoder 40, as shown in FIG. 14, iteratively performs DEC1 and DEC2, performs CRC check on every DEC2 result, and reports the CRC check result to the HARQ controller 30. Here, DEC1 and DEC2 refer to a component decoder #1 and a component decoder #2, respectively, used in each turbo decoder. An iteration number of the fast turbo decoder 40 is determined depending on a condition of a received channel and a size of an encoder packet. As illustrated in FIG. 14, the first output buffer (OBUF0) 410 and the second output buffer (OBUF1) 420 are subject to write enable switching, as follows.

(1) The first output buffer OUT_BUF0 is provided with a write enable signal WRITE_ENABLE when a (k+2m)$^{th}$ turbo decoder enable signal PDCH_TURBO_EN[k+2m] of a packet data channel is set up, where m=0, 1, 2, . . . .

(2) The first output buffer OUT_BUF0 is provided with a read enable signal READ_ENABLE when a (k+2m)$^{th}$ turbo decoding-done signal PDCH_TURBO_DONE[k+2m] is set up, where m=0, 1, 2, . . . .

(3) The second output buffer OUT_BUF1 is provided with a write enable signal WRITE_ENABLE when a (k+2m+1)$^{th}$ turbo decoder enable signal PDCH_TURBO_EN[k+2m+1] of a packet data channel is set up, where m=0, 1, 2, . . . .

(4) The second output buffer OUT_BUF1 is provided with a read enable signal READ_ENABLE when a (k+2m+1)$^{th}$ turbo decoding-done signal PDCH_TURBO_DONE[k+2m+1] is set up, where m=0, 1, 2, . . . .

Referring to FIG. 14, it is noted that decoding of a packet data channel is performed over 3 slots from a time when the $k^{th}$ turbo decoder enable signal PDCH_TURBO_EN[k] of a packet data channel is generated through a time when data transferring is completed. However, in the 1-slot ACK/NAK_DELAY mode, it is. preferable that the HARQ controller 30 sets up the $k^{th}$ turbo decoder enable signal PDCH_TURBO_EN[k] of a packet data channel as earliest as possible after the $k^{th}$ turbo decoding-done signal PDCH_TURBO_DONE [k] is set up. Therefore, a gap between the two signals is not long. As a result, in FIG. 14, even though data transmission for EP[k] is suspended at the slot boundary and its environs, a data transferring time is not considerably affected.

Figure 15:
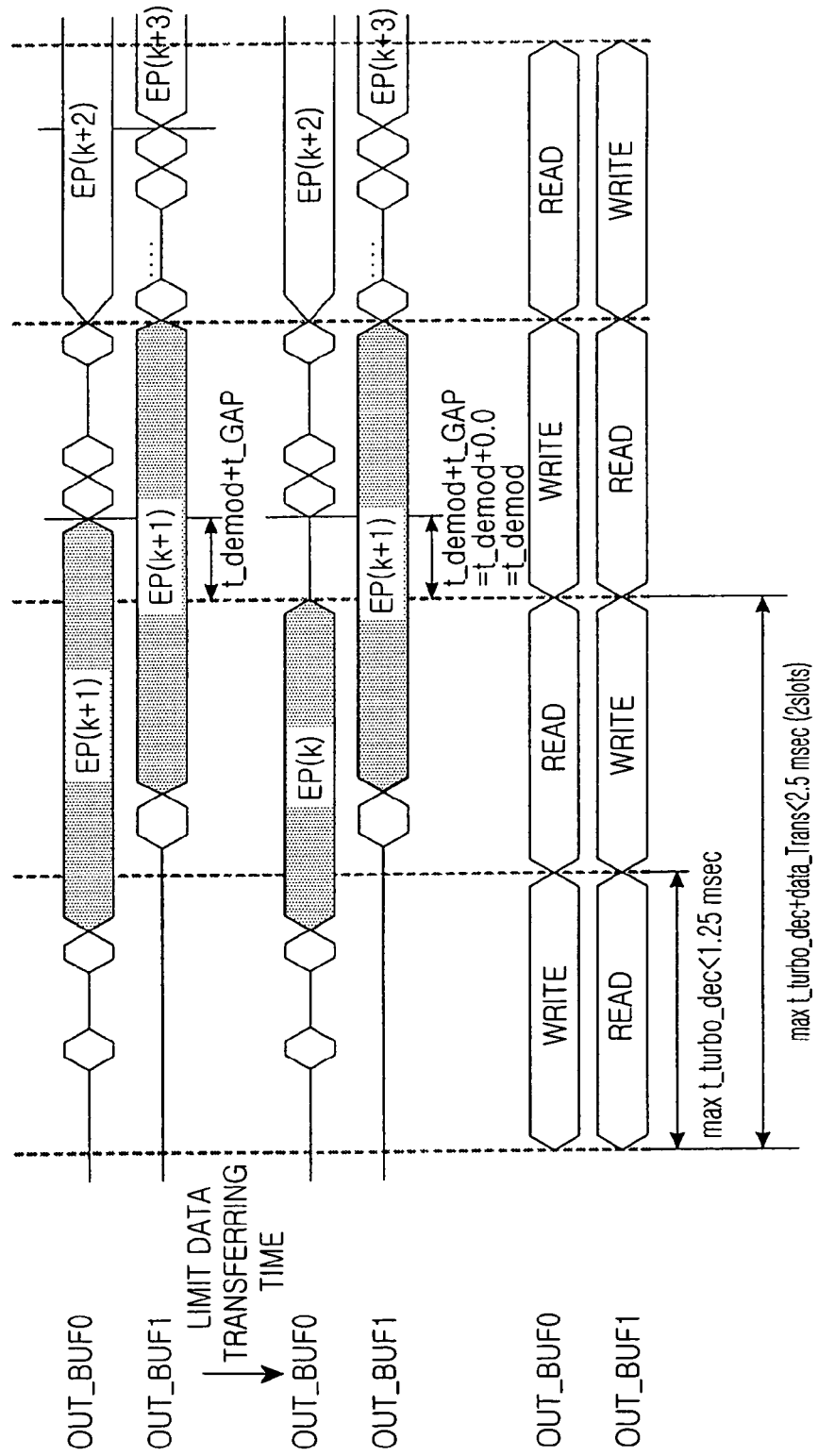
FIG. 15 is a timing diagram illustrating an example in which the sum of a decoding time of a fast turbo decoder and a data transferring time is limited to 2.5 msec in a 1-slot ACK/NAK_DELAY mode according to an embodiment of the present invention.

FIG. 15 is a timing diagram illustrating an example in which the sum of a decoding time of a fast turbo decoder and a data transferring time is limited to 2.5 msec in a 1-slot ACK/NAK_DELAY mode according to an embodiment of the present invention. With reference to FIG. 15, a detailed description will now be made of the case in which the sum of a decoding time of the fast turbo decoder 40 and a data transferring time is limited not to exceed 2.5 msec in a 1-slot ACK/NAK_DELAY mode according to a preferred embodiment of the present invention.

The reason for limiting the sum of a decoding time of the fast turbo decoder 40 and a data transferring time not to exceed 2.5 msec is to simplify control of the output buffer. In the 1-slot ACK/NAK_DELAY mode, in most cases, it is possible to assign the longest decoding time by placing the turbo decoder enable signal PDCH_TURBO_EN of a packet data channel as close as possible to the slot boundary. Commonly, the data transferring time reduced in this manner is shorter than 't_demod+t_GAP'. Since the 't_demod' is a very small value, the difference is not considerable. Therefore, in the 1-slot ACK/NAK_DELAY mode, all operations, including PDCH demodulation, demapping, decoding by the fast turbo decoder 40 and data transferring, are performed within 2 slots (2.5 msec).

Figure 16:
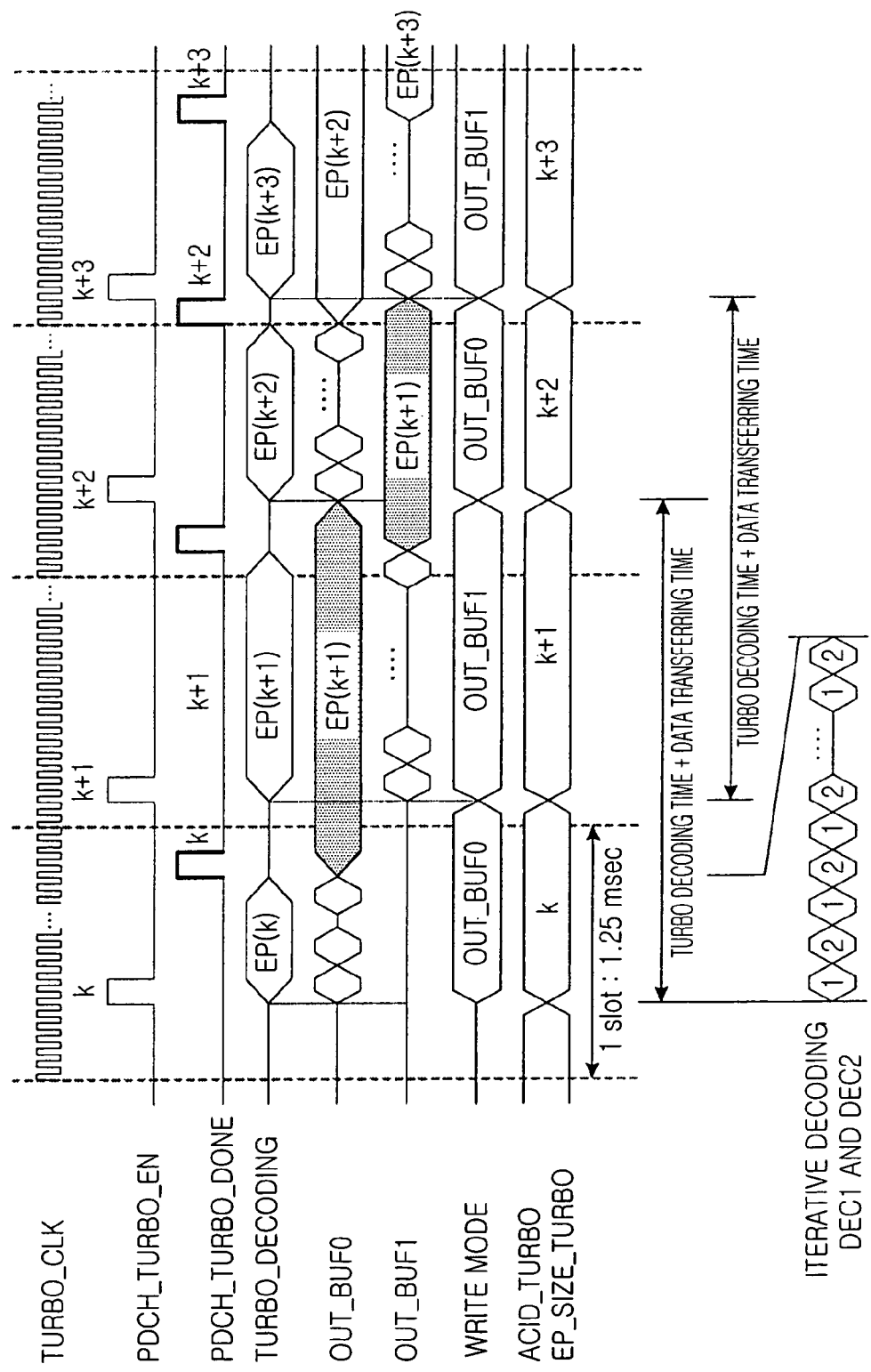
FIGS. 16 and 17 are timing diagrams of an output buffer in a fast turbo decoder in a 2-slot ACK/NAK_DELAY mode according to an embodiment of the present invention.
Figure 17:
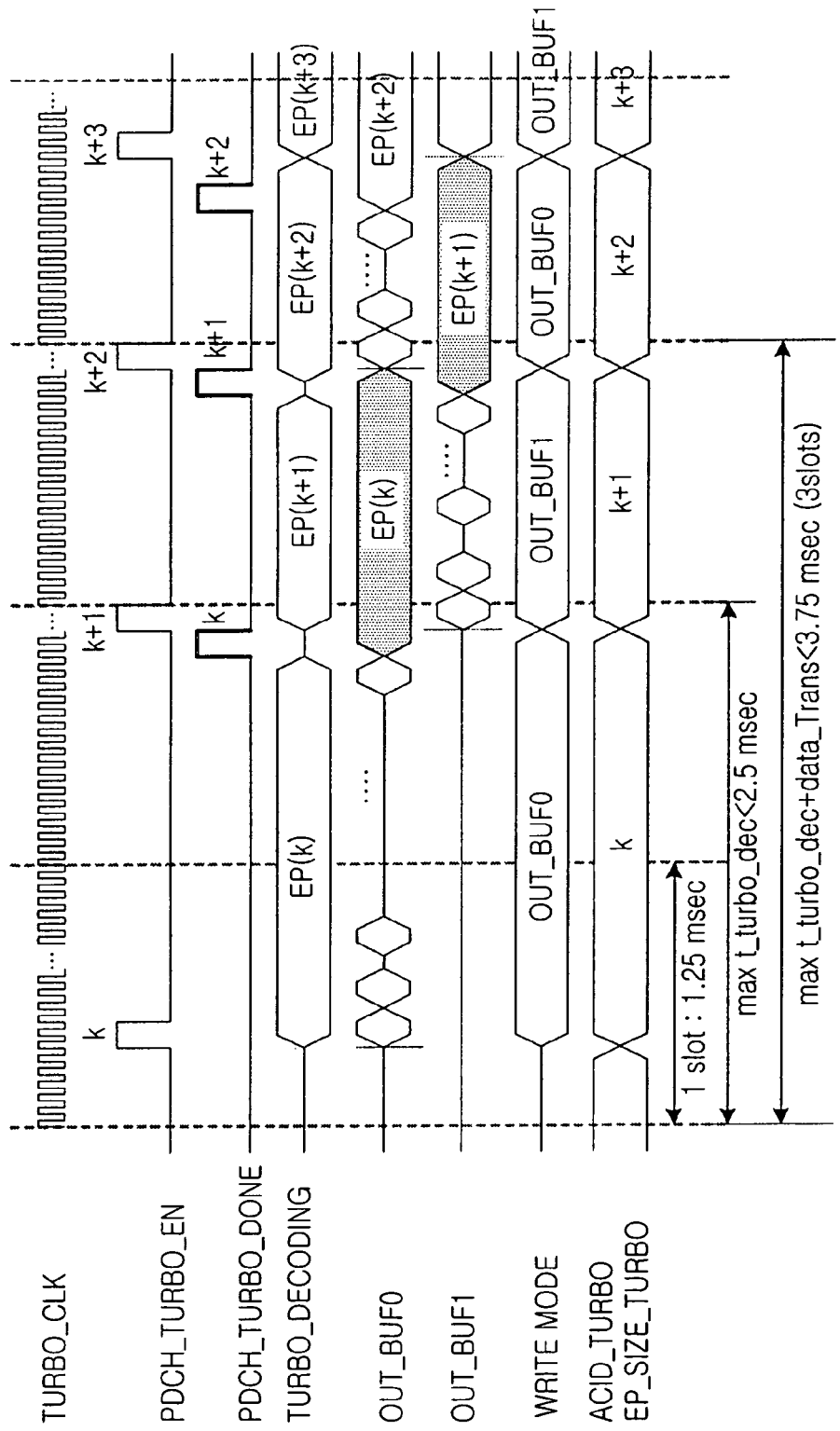

FIGS. 16 and 17 are timing diagrams of an output buffer in a fast turbo decoder in a 2-slot ACK/NAK_DELAY mode according to an embodiment of the present invention. With reference to FIGS. 16 and 17, a detailed description will now be made of an operation of an output buffer in a fast turbo decoder in the 2-slot ACK/NAK_DELAY mode according to an embodiment of the present invention.

As illustrated in FIG. 16, an output buffer in the fast turbo decoder 40 uses a turbo decoding clock TURBO_CLK as a system clock, and also uses the turbo decoder enable signal PDCH_TURBO_EN of a packet data channel as the system clock. Unlike in the 1-slot ACK/NAK_DELAY mode, in the 2-slot ACK/NAK_DELAY mode, read/write switching of an output buffer occurs at irregular intervals. It can be noted that read/write switching is irregular according to generation positions of the turbo decoder enable signal PDCH_TURBO_EN of a packet data channel is and the turbo decoding-done signal. As illustrated in FIG. 16, the fast turbo decoder 40 can maintain decoding of a $k^{th}$ encoder packet until a time at which a $(k+1)^{th}$ turbo decoder enable signal PDCH_TURBO_EN[k+1] of a packet data channel is generated. Therefore, a read/write switching time of the output buffer is also determined by the turbo decoder enable signal PDCH_TURBO_EN of a packet data channel. In addition, it can be noted from FIG. 16 that decoding of a packet data channel and data transferring are performed over 3 slots from a time when the $k^{th}$ turbo decoder enable signal PDCH_TURBO_EN[k] of a packet data channel is generated through a time when data transferring is completed. As illustrated in FIG. 16, a data transferring time is longer than or equal to a minimum of 1.25 msec.

FIG. 17 illustrates an extreme example of data transferring and decoding by the fast turbo decoder 40 according to an embodiment of the present invention. As illustrated in FIG. 17, when a $(k+1)^{th}$ turbo decoder enable signal PDCH_TURBO_EN[k+1] of a packet data channel is generated at a rear boundary of a slot and a $(k+2)^{th}$ turbo decoder enable signal PDCH_TURBO_EN[k+2] of a packet data channel is generated at a rear boundary of the nest slot, PDCH decoding and data transferring can occur over almost 3 slots.

Figure 18:
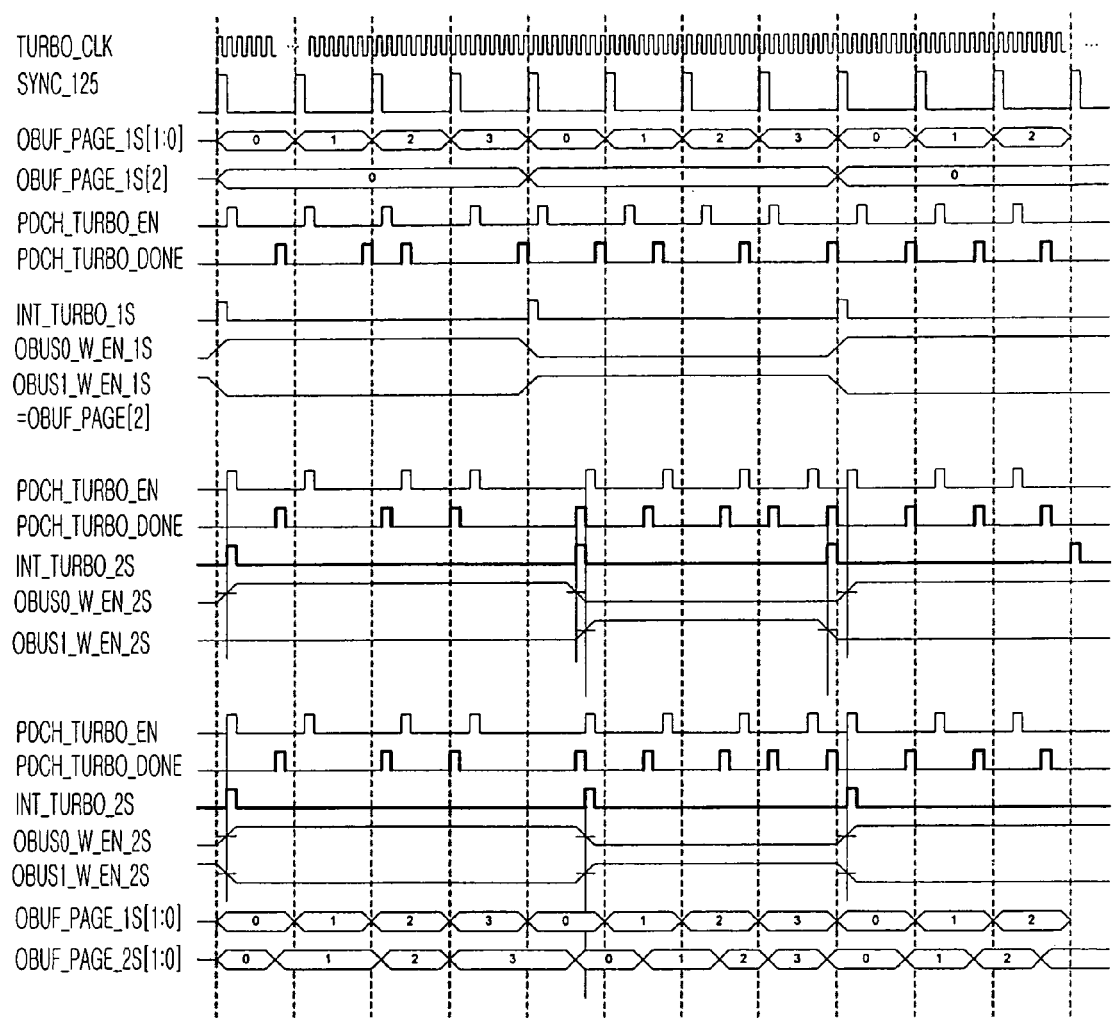
FIG. 18 is a timing diagram illustrating examples of control timings of an output buffer and operations of a fast turbo decoder in a 1-slot ACK/NAK_DELAY mode and a 2-slot ACK/NAK_DELAY mode according to an embodiment of the present invention.

FIG. 18 is a timing diagram illustrating examples of control timings of an output buffer and operations of a fast turbo decoder in a 1-slot ACK/NAK_DELAY mode and a 2-slot ACK/NAK_DELAY mode according to an embodiment of the present invention. With reference to FIG. 18, a detailed description will now be made of typical output buffer control timings and fast turbo decoder's operations in a 1-slot ACK/NAK_DELAY mode and a 2-slot ACK/NAK_DELAY mode according to an embodiment of the present invention.

Since the output buffer 300 supports both the 1-slot ACK/NAK_DELAY and 2-slot ACK/NAK_DELAY modes, it should be able to independently operate for each mode. First, an operation in the 1-slot ACK/NAK_DELAY mode will be described. It can be noted from FIG. 18 that in the 1-slot ACK/NAK_DELAY mode, selection of output buffers OBUF0 and OBUF1 and page selection in each output buffer are performed on a regular basis. In addition, the processor 50 supports a method of gathering 4 decoded encoder packets and transmitting the gathered encoder packets every 5 msec, in order to reduce an interrupt load. Major operations in the 1-slot ACK/NAK_DELAY mode will be described below.

(1) Switching of the first output buffer (OBUF0) 410 and the output buffer (OBUF1) 420 and page switching in a particular output buffer are performed by 1-slot buffer page select signals OBUF_PAGE_1S[2] and OBUF_PAGE_1S[1:0] which are signals determined by a value of a counter that operates depending on a system time SYNC_125 (1.25-msec slot SYNC), irrespective of a generation position of a turbo decoder enable signal PDCH_TURBO_EN of a packet data channel in one slot.

(2) The first output buffer (OBUF0) 410 and the second output buffer (OBUF1) 420 are each divided into of 4 pages by the OBUF_PAGE_1S[1:0]. In addition, page switching in each output buffer occurs on a regular basis by a value between 0 and 3 periodically generated by a 3-it counter.

(3) When a turbo decoder enable signal PDCH_TURBO_EN of a packet data channel is generated, the fast turbo decoder 40 stores decoded data in a corresponding page of the output buffer according to page information of the output buffer assigned by the HARQ controller 30.

(4) In order to send the processor 50 an interrupt for data transmission, the HARQ controller 30 generates a turbo interrupt signal INT_TURBO every 5 msec, and this signal is determined by a value of a counter that operates according to a system time SYNC_125 (1.25-msec slot SYNC).

(5) Switching of read/write modes between the first output buffer (OBUF0) 410 and the second output buffer (OBUF1) 420 is determined by a turbo interrupt signal INT_TURBO.

(6) Read/write operations of the first output buffer (OBUF0) 410 and the second output buffer (OBUF1) 420 are mutually exclusive.

(7) When 4 encoder packets are continuously transmitted, all data is stored in page#0, page#1, page#2 and page#3 of the output buffer. In contrast, when only several encoder packets are transmitted and no data is transmitted in the remaining period, data is stored only in a slot where a turbo decoder enable signal PDCH_TURBO_EN of a packet data channel is generated among the 4 pages of the output buffer. However, switching between read/write modes must be performed according to the turbo interrupt signal INT_TURBO.

Next, an operation in the 2-slot ACK/NAK_DELAY mode will be described. It can be noted from FIG. 18 that in the 2-slot ACK/NAK_DELAY mode, selection of output buffers OBUF0 and OBUF1 and page selection in each output buffer are performed on an irregular basis. This is because the fast turbo decoder 40 performs decoding, crossing over the slot boundary. Like in the 1-slot ACK/NAK_DELAY mode, the processor 50 supports a method of gathering 4 decoded encoder packets and transmitting the gathered encoder packets at every 5-msec boundary and its environs, in order to reduce an interrupt load. Major operations in the 2-slot ACK/NAK_DELAY mode are summarized below.

(1) Buffer switching of the first output buffer (OBUF0) 410 and the output buffer (OBUF1) 420 and page switching in a particular output buffer occur in association with a generation position of a turbo decoder enable signal PDCH_TURBO_EN of a packet data channel in one slot and a generation position of a turbo decoding-done signal PDCH_TURBO_DONE. In addition, its value is determined considering the OBUF_PAGE_1S[1:0] which is a signal determined by a value of a counter that operates according to a system time SYNC_125 (1.25-msec slot SYNC).

(2) The first output buffer (OBUF0) 410 and the second output buffer (OBUF1) 420 are each divided into of 4 pages by a 2-slot output buffer select signal OBUF_PAGE_2S[1:0] and this value is updated by generation of a turbo decoding-done signal PDCH_TURBO_DONE. That is, regarding page switching in each output buffer, a page of the output buffer is selected by a value of a counter up-counted by a turbo decoding-done signal PDCH_TURBO_DONE starting at a page #0 in the 2-slot output buffer select signal OBUF_PAGE_2S[1:0] cleared by a turbo interrupt INT_TURBO.

(3) When a turbo decoder enable signal PDCH_TURBO_EN of a packet data channel is generated, the fast turbo decoder 40 stores decoded data in a corresponding page of the output buffer according to page information of the output buffer assigned by the HARQ controller 30. Pages of the output buffer cannot be switched until a turbo decoding-done signal is generated. Therefore, in some cases, one page may be continued for 4 slots. This is the most significant difference from the 1-slot ACK/NAK_DELAY.

(4) In order to send the processor 50 an interrupt for data transmission, the HARQ controller 30 generates a turbo interrupt signal INT_TURBO every 5-msec boundary and its vicinity, and this signal is determined depending on page#0 information generated from the OBUF_PAGE_1S[1:0] for the 1-slot ACK/NAK_DELAY, whether a turbo decoder enable signal PDCH_TURBO_EN of a packet data channel is generated from the page#0, and whether a turbo decoder enable signal PDCH_TURBO_EN of a packet data channel is generated in 4 previous slots.

(5) Switching of read/write modes between the first output buffer (OBUF0) 410 and the second output buffer (OBUF1) 420 is determined by a turbo interrupt signal INT_TURBO.

(6) Read/write operations of the first output buffer (OBUF0) 410 and the second output buffer (OBUF1) 420 are mutually exclusive.

(7) When 4 encoder packets are continuously transmitted, all data is stored in page#0, page#1, page#2 and page#3 of the output buffer. In contrast, when only several encoder packets are transmitted and no data is transmitted in the remaining period, data is stored only in a slot where a turbo decoder enable signal PDCH_TURBO_EN of a packet data channel is generated among the 4 pages of the output buffer. However, switching between read/write modes must be performed according to the turbo interrupt signal INT_TURBO.

In the 2-slot ACK/NAK_DELAY mode, as illustrated in FIG. 18, actual switching of the read/write modes of the first output buffer 410 and the second output buffer 420 should be independently performed by a turbo decoder enable signal PDCH_TURBO_EN of a packet data channel and a turbo decoding-done signal PDCH_TURBO_DONE. However, when the fast turbo decoder 40 has already completed decoding in a previous slot, it is preferable to generate the turbo decode enable signal PDCH_TURBO_EN of a packet data channel as early as possible. Since a time difference between these two cases is very slight, switching of read/write modes is determined using the turbo decoder enable signal PDCH_TURBO_EN of a packet data channel.

Figure 19:
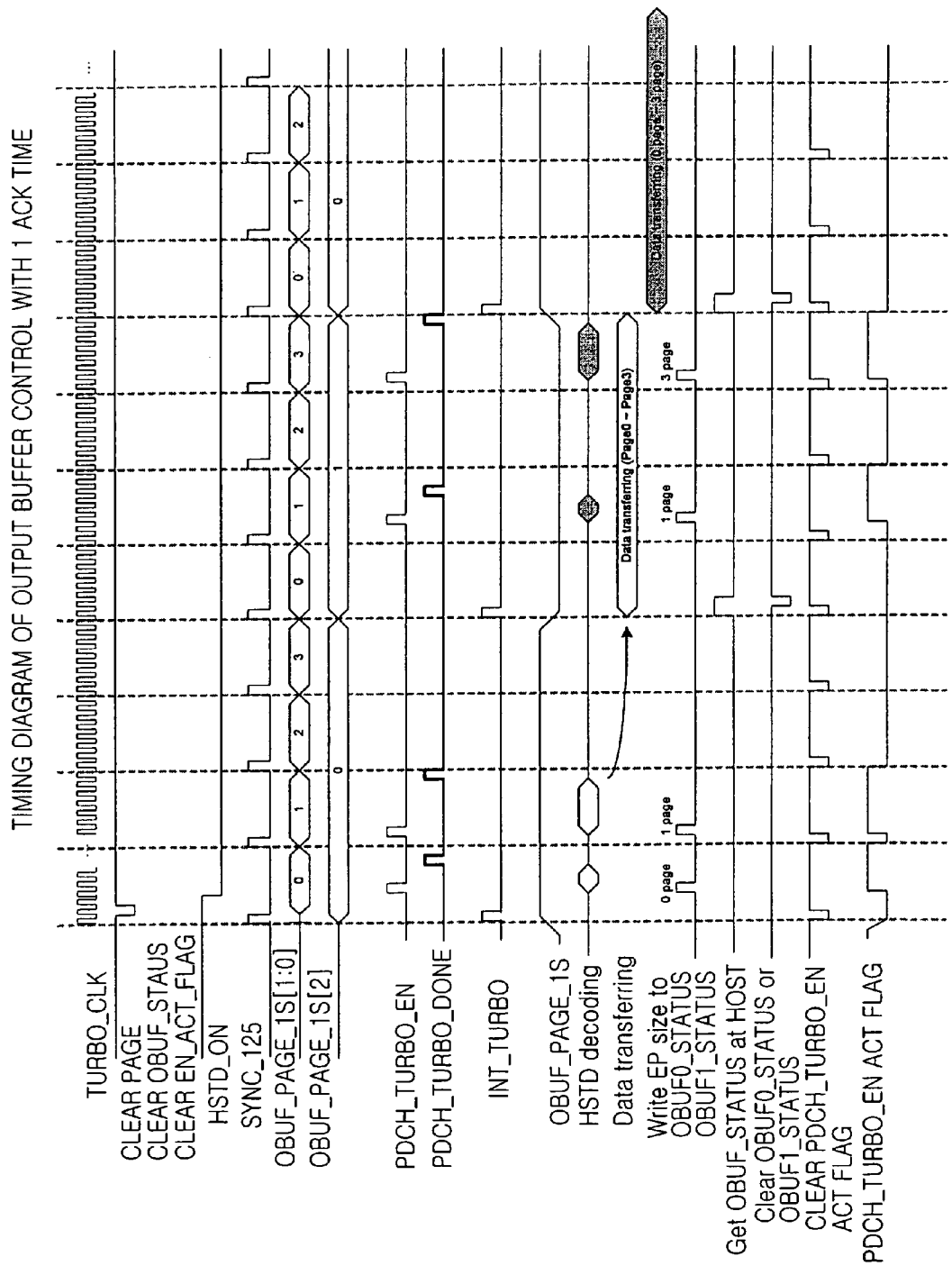
FIG. 19 is a diagram illustrating operational timing between the processor, the HARQ controller and the fast turbo decoder in a 1-slot ACK/NAK_DELAY mode according to an embodiment of the present invention.

FIG. 19 is a diagram illustrating operational timing between the processor, the HARQ controller and the fast turbo decoder in a 1-slot ACK/NAK_DELAY mode according to an embodiment of the present invention. With reference to FIG. 19, a detailed description will now be made of operational timings between the processor, the HARQ controller and the fast turbo decoder in the 1-slot ACK/NAK_DELAY mode according to the embodiment of the present invention.

First, operation in the 1-slot ACK/NAK_DELAY mode will be described. In the 1-slot ACK/NAK_DELAY mode, the HARQ controller 30, as stated above, periodically provides a 1-slot output buffer write enable signal OBUF0_W_EN_1S for selecting an output buffer OBUF0 or OBUF1 for writing, and the signal OBUF_PAGE_1S[1:0] for selecting a page from the selected output buffer. In addition, the turbo decoding-done signal PDCH_TURBO_DONE must be generated in the slot where the turbo decoder enable signal PDCH_TURBO_EN of a packet data channel is generated. The fast turbo decoder 40 performs a decoding operation in a period between the turbo decoder enable signal PDCH_TURBO_EN and the turbo decoding-done signal PDCH_TURBO_DONE. The HARQ controller 30 writes a value of a turbo decoding signal EP_SIZE_TURBO determined by a size of the encoder packet in this register, each time the turbo decoder enable signal PDCH_TURBO_EN of a packet data channel is generated in addition to a first output buffer status signal OBUF0_STATUS and a second output buffer status signal OBUF1_STATUS. The writing is performed using codes in Table 2. Switching of read/write modes of the first and second output buffers OBUF0 and OBUF1 is performed by a 1-slot turbo interrupt signal INT_TURBO_1S that is generated every 5 msec, and data transferring can be performed for 5 msec. Information on an output buffer status OBUF_STATUS, as illustrated in FIG. 19, is delivered from the HARQ controller 30 to the fast turbo decoder 50 when a 1-slot turbo interrupt signal INT_TURBO_1S is generated, and thereafter, all status registers of the output buffer switched to a write mode are cleared. In addition, an active flag of a turbo decoder enable signal PDCH_TURBO_EN of a packet data channel is cleared every 1.25 msec.

If a turbo decoder enable signal PDCH_TURBO_EN of a packet data channel is generated as described in conjunction with FIG. 10, an active flag of the turbo decoder enable signal PDCH_TURBO_EN of a packet data channel is switched to '1' in status, and is cleared again by a system time signal SYNC_125 at the slot boundary. If a turbo decoding-done signal PDCH_TURBO_DONE is set up and a packet data channel has a bad CRC or the HARQ controller 30 sets an intentional STOP (INT_STOP), then the HARQ controller 30 sets 'Empty (=000b)' in an output buffer status signal OBUF_STATUS0 (or OBUF_STATUS1) corresponding to a page of a current write output buffer when the packet data channel has a bad CRC as a result of CRC check on the packet data channel. The processor 50 then can skip this point without reading data. If there is no data in other pages except the bad-CRC page in the first and second output buffers OBUF0 and OBUF1, a processor interrupt signal INT_HOST is not generated. In addition, PDCH_TURBO_DONE or INT_STOP is used as a PAGE_SELECTOR (2 ACK_TIME) input signal considering the case where the HARQ controller 30 sets a stop interrupt signal INT_STOP. That is, even when the stop interrupt signal INT_STOP is generated, the processor 50 performs page switching considering the INT_STOP as a turbo decoding-done signal PDCH_TURBO_DONE due to 'CRC Bad'. Information on the page where a stop interrupt signal INT_STOP is generated is held because CRC check is performed after the stop interrupt signal INT_STOP and at this time, 'CRC Good' can occur.

Figure 20:
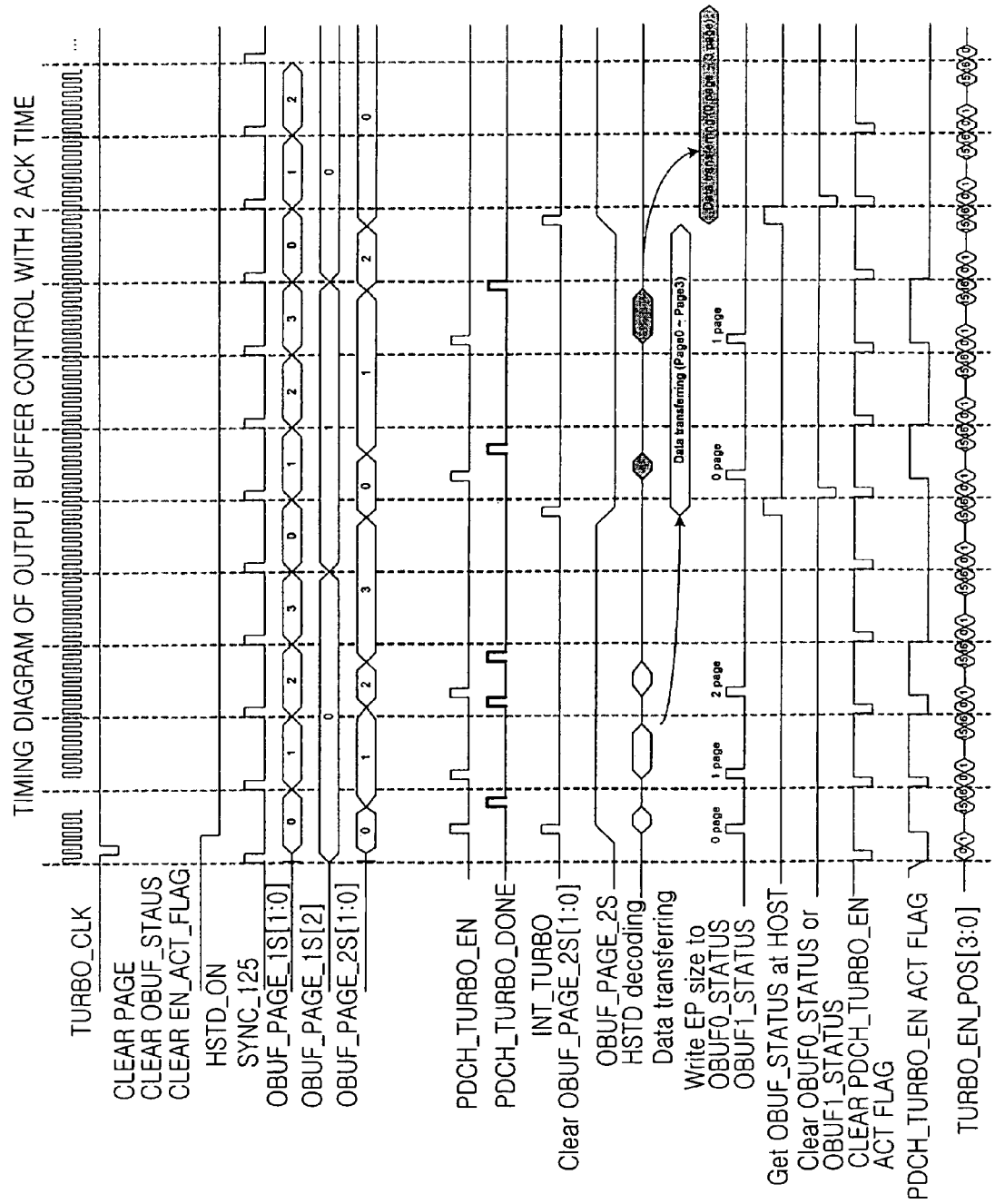
FIG. 20 is a diagram illustrating operational timing between the processor, the HARQ controller and the fast turbo decoder in a 2-slot ACK/NAK_DELAY mode according to an embodiment of the present invention.

FIG. 20 is a diagram illustrating operational timing between the processor, the HARQ controller and the fast turbo decoder in a 2-slot ACK/NAK_DELAY mode according to an embodiment of the present invention. With reference to FIG. 20, a detailed description will now be made of operational timings between the processor, the HARQ controller and the fast turbo decoder in the 2-slot ACK/NAK_DELAY mode according to the embodiment of the present invention.

In the 2-slot ACK/NAK_DELAY mode, the HARQ controller 30, as stated above, non-periodically provides a 2-slot first output buffer write enable signal OBUF0_W_EN_2S for selecting an output buffer OBUF0 or OBUF1 for writing, and a 2-slot output buffer page signal OBUF_PAGE_2S[1:0] for selecting a page from the selected output buffer. In addition, the HARQ controller 30 non-periodically generates a 2-slot turbo interrupt signal INT_TURBO_2S for data transmission every 5 msec. A turbo decoder enable signal PDCH_TURBO_EN of a packet data channel can be generated in a particular position after a demodulation-done signal PDCH_DEMOD_DONE is generated by the AHRQ controller 30. In addition, generation of a turbo decoding-done signal PDCH_TURBO_DONE can be delayed until the next slot of a slot where the turbo decoder enable signal PDCH_TURBO_EN of a packet data channel is generated. The fast turbo decoder 40 performs a decoding operation in a period between the turbo decoder enable signal PDCH_TURBO_EN and the turbo decoding-done signal PDCH_TURBO_DONE. In addition, the HARQ controller 30 writes a value of a turbo decoding signal EP_SIZE_TURBO determined by a size of the encoder packet in this register, each time the turbo decoder enable signal PDCH_TURBO_EN of a packet data channel is generated in addition to a first output buffer status signal OBUF0_STATUS and a second output buffer status signal OBUF1_STATUS. The writing in the register is performed using codes in Table 2. Switching of read/write modes of the first and second output buffers OBUF0 and OBUF1 is performed by a 2-slot turbo interrupt signal INT_TURBO_2S that is generated every 5 msec, and data transferring can be performed for 5 msec.

Information on an output buffer status OBUF_STATUS, as illustrated in FIG. 20, is delivered from the HARQ controller 30 to the fast turbo decoder 50 when a 2-slot turbo interrupt signal INT_TURBO_2S is generated, and thereafter, all status registers of the output buffer switched to a write mode are cleared. In addition, an active flag of a turbo decoder enable signal PDCH_TURBO_EN of a packet data channel is cleared every 1.25 msec.

If a turbo decoder enable signal PDCH_TURBO_EN of a packet data channel is generated within one slot as described in conjunction with FIG. 10, an active flag of the turbo decoder enable signal PDCH_TURBO_EN of a packet data channel is switched to '1' in status, and is cleared again by a system time signal SYNC_125 at the slot boundary. If a turbo decoding-done signal PDCH_TURBO_DONE is set up and a packet data channel has a bad CRC or the HARQ controller 30 sets an intentional STOP (INT_STOP), then the HARQ controller 30 sets 'Empty (=000b)' in an output buffer status signal OBUF_STATUS0 (or OBUF_STATUS1) corresponding to a page of a current write output buffer when the packet data channel has a bad CRC as a result of CRC check on the packet data channel. The processor 50 then can skip this point without reading data. If there is no data in other pages except the bad-CRC page in the first and second output buffers OBUF0 and OBUF1, a processor interrupt signal INT_HOST is not generated. In addition, the turbo decoding-done signal PDCH_TURBO_DONE or the stop interrupt signal INT_STOP is used as a PAGE_SELECTOR (2 ACK_TIME) input signal considering the case where the HARQ controller 30 sets a stop interrupt signal INT_STOP. That is, even when the stop interrupt signal INT_STOP is generated, the processor 50 performs page switching considering the INT_STOP as a turbo decoding-done signal PDCH_TURBO_DONE due to 'CRC Bad'. Information on the page where a stop interrupt signal INT_STOP is generated is held because CRC check is performed after the stop interrupt signal INT_STOP and at this time, 'CRC Good' can occur. As shown in FIG. 20, unlike OBUF0_PAGE_1S[1:0], OBUF0_PAGE_2S[1:0] can be held instead of being switched, crossing over the slot boundary, and it can be maintained with the same value for a maximum of 4 slots.

As illustrated in FIG. 20, a 2-slot turbo interrupt signal INT_TURBO_2S is generated by compulsory when TURBO_EN_POS[3:0] currently observed by the HARQ controller 30 exceeds a threshold M of a turbo decoder enable signal PDCH_TURBO_EN of a packet data channel even though the turbo decoder enable signal PDCH_TURBO_EN of a packet data channel is not generated like in a $5^{th}$ slot, even in other cases except the case where the turbo decoder enable signal PDCH_TURBO_EN of a packet data channel is generated in a page#0 generated by the OBUF_PAGE_1S[1:0] like in the first slot. This is because the first output buffer 410 and the second output buffer 420 should be switched every 5 msec. Of course, when there is no encoder packet decoded in 4 previous slots, the 2-slot turbo interrupt signal INT_TURBO_2S is disabled by the interrupt generator 360 described in conjunction with FIG. 10, so no interrupt is practically generated to the processor 50.

Figure 21:
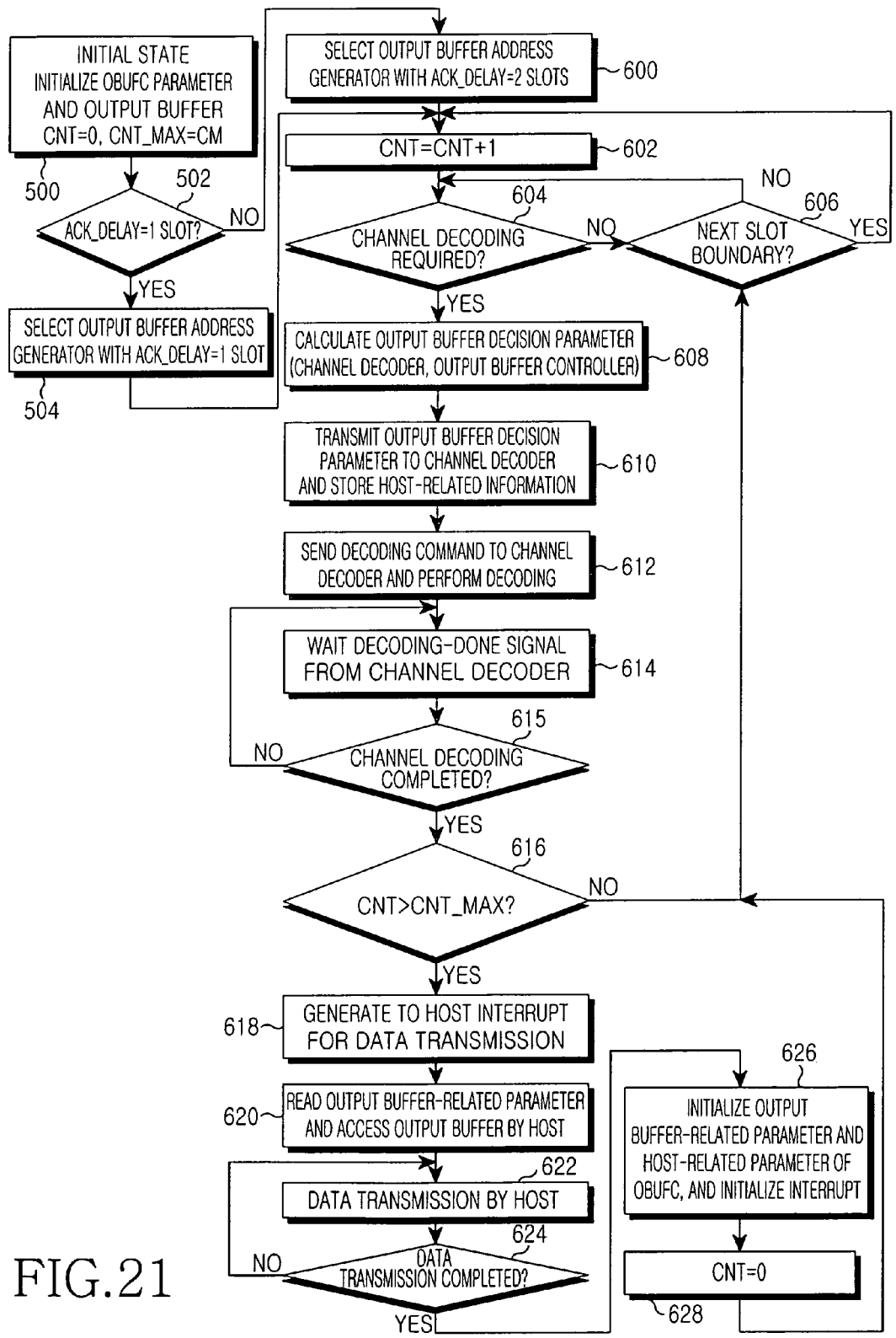
FIG. 21 is a flowchart illustrating an entire control operation performed by the output buffer controller according to an embodiment of the present invention.

FIG. 21 is a flowchart illustrating an entire control operation performed by the output buffer controller according to an embodiment of the present invention. With reference to FIG. 21, a detailed description will now be made of a control operation performed by the output buffer controller according to the embodiment of the present invention.

First, an initialization operation of the output buffer controller 300 will be described. The output buffer controller 300 performs an initial state in step 500. In the initial state, the output buffer controller 300 performs parameter initialization and output buffer initialization, sets an initial value of a counter to '0', and sets a maximum value of the counter to a predetermined value CM. Here, CM denotes a particular constant determined by a designer. The initialization operation corresponds to a process of initializing parameters of an address generator. Thereafter, the output buffer controller 300 determines in step 502 whether ACK_DELAY is 1 slot. If ACK_DELAY is 1 slot, the output buffer controller 300 proceeds to step 504. Otherwise if ACK_DELAY is 2 slots, the output buffer controller 300 proceeds to step 600. In step 504, the output buffer controller 300 selects an output buffer address generator based on 1-slot ACK_DELAY, and then proceeds to step 602. The output buffer controller 300 performs setting based on 1-slot or 2-slot ACK_DELAY because the 1x EV-DV system is given a variable decoding time. Therefore, since an output buffer address generator is changed according to ACK_DELAY provided in the system, this must be determined in advance.

After the initialization, the output buffer controller 300 performs the process of steps 600 to 628. A detailed description will now be made of the process of steps 600 to 628 performed by the output buffer controller 300.

In step 600, the output buffer controller 300 selects a 2-slot ACK_DELAY-based output buffer address generator based, and then proceeds to step 602. After selecting an output buffer address generator based on 1-slot or 2-slot ACK_DELAY, the output buffer controller 300 increases a count value by 1 instep 602, and then proceeds to step 604. The output buffer controller 300 determines in step 604 whether channel decoding is required due to reception of a new packet. If no packet is received from a receiver at a current slot boundary, the output buffer controller 300 should wait until the next slot boundary. Particularly, in the case of 2-slot ACK_DELAY, since channel decoding can be performed a maximum of two times in one slot, another packet can be received for channel decoding before the slot boundary. Therefore, a process of determining whether a current timing is a slot boundary and waiting a packet to be received if no packet is received should be performed. If it is determined in step 604 that a new packet has been received, the output buffer controller 300 proceeds to step 608. Otherwise, the output buffer controller 300 proceeds to step 606 and determines whether a current timing is the next slot boundary. If it is determined in step 606 that the current timing is the next slot boundary, the output buffer controller 300 returns to step 602 where it increases the count value by 1, and then performs the step 604 again. However, if it is determined in step 606 that the current timing is not the next slot boundary, the output buffer controller 300 returns to step 604.

In step 608, the output buffer controller 300 calculates an output buffer decision parameter. The output buffer decision parameter is a parameter value to be used in the fast turbo decoder 40 and the output buffer controller 300. After the parameter calculation, the output buffer controller 300 transmits in step 610 the output buffer decision parameter to the fast turbo decoder 40 and at the same time, stores information related to reception data to be delivered to the processor 50. Thereafter, in step 612, the output buffer controller 300 sends a decoding command to the fast turbo decoder 40. That is, if awaited packet data is received from the receiver, the output buffer controller 300 must generate information for decoding the received packet, generate information on a storage position an output buffer to select one of double output buffers, select a page of the selected output buffer, and deliver information related to read/write mode setting to the fast turbo decoder 40 in advance, or deliver the information together with a decoding start signal. Through this, the fast turbo decoder 40 performs a turbo decoding process. In step 614, the output buffer controller 300 waits for turbo decoding of the fast turbo decoder 40 to be completed. In step 615, the output buffer controller 300 determines whether the turbo decoding is completed. If the turbo decoding is completed, the output buffer controller 300 proceeds to step 616, and otherwise, returns to step 614.

In step 616, the output buffer controller 300 determines whether a storage time of the output buffer has passed. If it is determined in step 616 that a storage time of the output buffer has passed, the output buffer controller 300 proceeds to step 618, and if a storage time of the output buffer has not passed, the output buffer controller 300 returns to step 606. Upon receiving a turbo decoding-done signal PDCH_TURBO_DONE of a packet data channel, the output buffer controller 300 determines whether a data storage time of the output buffer has passed the maximum storage time. If it's time to shift data accumulated so far to the processor 50, the output buffer controller 300 delivers information on the packets stored in the output buffer 400 and information on a storage position of the output buffer to the processor in advance, or delivers the information together with an interrupt. The maximum storage time is determined through a comparison between CNT and CNT_MAX, and this can be defined as CNT_MAX.

In step 618, the output buffer controller 300 sends the processor 50 an interrupt for data transmission. Thereafter, in step 620, the processor 50 reads a parameter related to an output buffer, stored in the output buffer controller 300, and at the same time, accesses the output buffer 400. At this time, the output buffer controller 300 holds an idle state for an access to the processor 50. In step 622, the processor 50 reads data of a decoded encoder packet stored in the accessed output buffer 400. Even in this case, the output buffer controller 300 holds the idle state. In step 624, the output buffer controller 300 determines whether data transmission from the output buffer 400 to the processor 50 is completed. If data transmission from the output buffer 400 to the processor 50 is completed, the output buffer controller 300 proceeds to step 626, and otherwise, the output buffer controller 300 holds the idle state until the processor 50 reads the data. In FIG. 21, steps 620 and 622 are provided to show an operation of the processor 50 as an example. Actually, the output buffer controller 300 holds the idle state at this time.

In step 626, the output buffer controller 300 initializes a parameter related to a read output buffer, initializes parameters delivered from the output buffer controller 300 to the processor 50, and initializes an interrupt signal. Thereafter, in step 628, the output buffer controller 300 sets the count value to '0', and then returns to step 606.

Through this process, the output buffer controller 300 can store decoded data and send the stored data to the processor 50.

Figure 22:
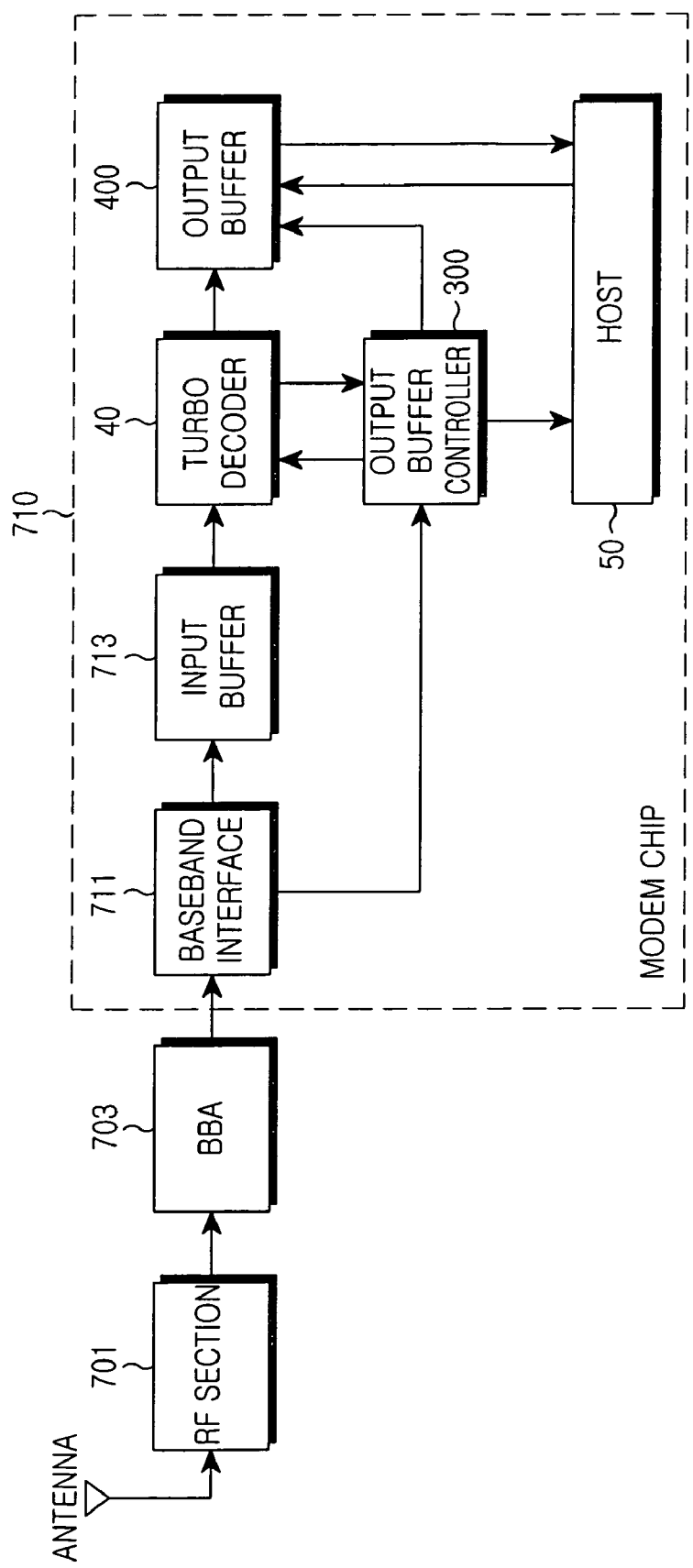
FIG. 22 is a block diagram illustrating a mobile station including an output buffer controller according to an embodiment of the present invention.

FIG. 22 is a block diagram illustrating a mobile station including an output buffer controller according to an embodiment of the present invention. With reference to FIG. 22, a detailed description will now be made of a structure and operation of a mobile station receiver including the output buffer controller 300 according to an embodiment of the present invention.

A radio frequency (RF) signal transmitted from a transmitter of a base station is received via an antenna of the mobile station, and then input to an RF section 701. The RF section 701 converts the RF signal received from the antenna into an intermediate frequency (IF) signal, and then converts the IF signal into a baseband signal. The analog baseband signal is converted into a digital signal through a baseband analog processor (BBA) 703.

The digital signal is input to a baseband interface 711 in a modem 710. The baseband interface 711 separates the digital signal into traffic data and control data. The separated traffic data is stored in a particular area of an input buffer 713, while the separated control data is input to an output buffer controller 300. The control information input to the output buffer controller 300 is used as fundamental data based on which the output buffer controller 300 operates.

The traffic data stored in the input buffer 713 is input to a turbo decoder 40. Before the turbo decoder 40 performs turbo decoding, the output buffer controller 300 outputs information related to a write address where decoded data from the turbo decoder 40 is to be written. After completion of decoding, the turbo decoder 40 stores decoded data in a predetermined area of an output buffer 400 depending on the write address information from the control of the output buffer controller. In addition, the turbo decoder 40 provides the output buffer controller 300 with a decoding-done signal and decoding result information.

The output buffer controller 300 checks whether a predetermined interrupt condition is satisfied, based on the decoding-done signal and decoding result information received from the turbo decoder 40 for a predetermined time. Only when the interrupt condition is satisfied, the output buffer controller 300 generates an interrupt signal instructing a host (or processor) 50 to read data from the output buffer 400. At the same time, the output buffer controller 300 provides the host 50 with information related to a read address where data is to be read out from the output buffer 400.

Upon receiving the interrupt signal and the read address information, the host 50 calculates a read address of the output buffer 400 based on the read address information, and then reads decoded data stored in the read address of the output buffer 400.

As can be appreciated from the foregoing description, the embodiment of the present invention can deliver decoded data without increasing a load on a processor irrespective of ACK_DELAY=1 or ACK_DELAY=2 in an HARQ mobile communication system. In addition, the embodiment of the present invention can secure a decoding time of a fast turbo decoder, prevent wrong error detection due to discontinuity of HARQ-based retransmission packet data, and enable fast response.

While the invention has been shown and described with reference to a certain embodiment thereof, it will be understood by those skilled in the art that various changes in form and details may be made therein without departing from the spirit and scope of the invention as defined by the appended claims.

What is claimed is:

1. A mobile station apparatus for receiving packet data, decoding the received packet data and delivering the decoded packet data to an upper layer in a mobile communication system, the apparatus comprising:
   a turbo decoder for decoding the packet data;
   a dualized buffer for storing the decoded packet data, and outputting packet data upon receiving a read request,
   a buffer controller for receiving a decoding done signal from the turbo decoder, and generating an interrupt signal and a read address for reading data stored in the dualized buffer; and
   a processor for reading data stored in the dualized buffer according to the read address upon receiving the interrupt signal from the buffer controller;
   wherein the buffer controller comprises:
      a page buffer selector for receiving a system time signal of a receiver, selceting one dualized buffer according to a 1-slot delay response mode determined from the system time, and determining a given page of the selected buffer;
      a stop position selector for receiving the system time signal and a decoding clock, and generating a stop position signal that can be randomly set in one slot;
      a flag generator being cleared according to the system time of the receiver, for outputting a flag according to a turbo decoder enable signal of the packet data;
      a buffer selector for receiving a signal of the flag generator, an output signal of the stop position selector, and the turbo decoder enable signal, and selecting one of the dualized areas according to a 2-slot delay response mode;
      a page selector for selecting a page of the selected area according to the 2-slot delay response mode; and
      an interrupt controller for generating an interrupt signal by receiving signals from the page buffer selector, the buffer selector and the page selector, and buffer status signals from the duslized area buffer.

2. The mobile station apparatus of claim 1, wherein the dualized buffer is to store the decoded data, and wherein each of the dualized buffers is divided into several areas comprising a specified size and the decoded data is stored in the divided areas.

3. The mobile st sion apparatus of claim 1, wherein the read address includes an area information and address information of the buffer where the decoded data is stored.

4. The mobile station apparatus of claim 1, wherein the buffer controller is inyluded in a Hybrid Automatic Repeat Request (HARQ) controller located in a physical layer.

5. The mobile station apparatus of claim 1, wherein the decoded data information includes at least one of error information of the decoded data, status information of the decoder, and decoding-done information.

6. The mobile station apparatus of claim 1, wherein the buffer controller receives a system time signal, determines an ACK/NACK delay response mode depending on the received system time signal, and selects one dualized buffer according to the determined delay response mode.

7. The mobile station apparatus of claim 1, wherein the buffer controller determines whether there is any decoded data in the buffer and does not generate the interrupt signal when the decoded data is not in the buffer.

8. The mobile station apparatus of claim 1, wherein the buffer controller generates an interrupt signal and a read address for data reading, when at least two the decoding done signals are received.

9. The mobile station apparatus of claim 1, wherein the buffer controller generates the interrupt signal every 5 msec.

10. The mobile station apparatus of claim 1, wherein the buffer controller generates the interrupt signal according to a load on the processor.

11. The mobile station apparatus of claim 1, wherein after completion of decoding, the turbo decoder provides the buffer with the decoded data and a buffer address signal based on which decoded data is to be written.

12. A method for delivering decoded data to an upper layer in a mobile station apparatus including a decoder for decoding received packet data, the method comprising:
   (a) receiving the decoded data from the decoder;
   (b) generating an interrupt signal and a buffer read address for delivering the decoded data to the upper layer if a predetermined time has passed; and
   (c) transmitting the decoded data from the buffer to the upper layer based on the interrupt signal and the buffer read address generated;
   wherein the step of generating the interrupt signal comprises:
      receiving a clear signal and a system synchronization signal, and outputting a first buffer select signal, a first page select signal and a first interrupt signal corresponding to a 1-slot delay response mode based on the received clear signal and the system synchronization signal;
      generating a stop position signal that can be randomly set in one slot based on the clear signal the system synchronization signal and a decoding clock;
      outputting an active flag signal of the decoder according to a decoder enable signal of a packet data channel;
      generating a second buffer select signal and a second interrupt signal corresponding to a 2-slot delay response mode based on the active flag signal, the stop position signal, the decoder enable signal and the first page select signal;
      generating a second page select signal corresponding to the 2-slot delay response mode based on a decoding-done signal of the packet data channel, the clear signal and the second interrupt signal;
      receiving and outputting status signals of the buffer, and outputting the interrupt signal to a processor based on the 1st interrupt signal, the second interrupt signal and the status signals of the buffer; and wherein the buffer read address comprises of at least one of the first buffer select signal and the second buffer select signal, and at least one of the first page select signal and the second page select signal.

13. The method of claim 12, wherein the step (b) comprises:

receiving a system time signal and determining an ACK/NACK delay response mode depending on the received system time signal; and selecting at least one dualized buffer according to the determined delay response mode.

14. The method of claim 12, further comprising receiving a decoding-done signal after the decoder completes decoding of a high-rate packet data.

15. The method of claim 12, wherein the decoded data information includes at least one of error information of the decoded data, status information of the decoder, and decoding-done information.

16. The method of claim 12, wherein the predetermined time comprises 5 msec.

17. The method of claim 12, wherein the interrupt signal and the data read information are not generated when decoded packet data is not received for a predetermined time.

18. A method for delivering decoded data to an upper layer in a mobile station apparatus including a decoder for decoding received packet data, the method comprising:

receiving the decoded data from the decoder;

generating an interrupt signal and a buffer read address for delivering the decoded data to the upper layer if a predetermined number of data blocks are decoded by the decoder and stored in the output buffer; and transmittitig the decoded data to the upper layer based on the interrupt signal and the buffer address generated;

wherein the step of generating the interrupt signal comprises:

outputting a first buffer select signal, a first page select signal and a first interrupt signal corresponding to a 1-slot delay response mode based on the received clear signal arid the system synchronization signal;

generating a stop position signal that can be randomly set in one slot based on the clear signal, the system synchronization signal and a decoding clock;

being cleared according to the system synchronization signal, for outputting an active flag signal of the decoder according to a decoder enable signal of a packet data channel;

generating a second buffer select signal and a second interrupt signal corresponding to a 2-slot delay response mode based on the active flag signal, the stop position signal, the decoder enable signal and the first page select signal;

generating a second page select signal corresponding to the 2-slot delay response mode based on a decoding-done signal of the packet data channel, the clear signal and the second interrupt signal;

receiving and outputting status signals of the buffer, and outputting the interrupt signal to a processor based on the 1st interrupt signal, the second interrupt signal and the status signals of the buffer; and wherein the buffer read address comprises of at least one of the first buffer select signal and the second buffer select signal, and at least one of the first page select signal and the second page select signal.

19. The method of claim 18, wherein the buffer information includes information comprising an area and an address of the buffer, where the decoded data is stored.

20. The method of claim 18, further comprising:

if no packet data is decoded over the packet data channel within a predetermined time, an interrupt signal is not generated.

21. The method of claim 20, wherein the predetermined time comprises 5 msec.

22. The method of claim 18, wherein the predetermined number comprises at least two.

23. A mobile station apparatus for receiving high-rate packet data, decoding the received packet data and delivering the decoded packet data to an upper layer in a mobile communication system, the apparatus comprising:

an antenna for receiving a high-rate radio frequency (RF) encoder packet transmitted from a transmitter of a base station;

a RF section for converting the high-rate RF encoder packet received from the antenna into a baseband signal;

an analog-to-digital (A/D) conversion section for converting an analog signal from the RF section into a digital signal;

a turbo decoder for decoding the A/D converted high-rate encoder packet data;

a dualized buffer for storing the decoded packet data and outputting packet data upon receiving a read request;

a buffer controller for receiving the decoded data from the turbo decoder, and generating an interrupt signal and a read address for reading data stored in the dualizad buffer; and a processor for reading data stored in the dualized buffer according to the read address upon receiving the interrupt signal from the buffer controller;

wherein the buffer controller comprises:

a page buffer selector for receiving a system time signal of a receiver, selecting one dualized buffer according to a 1-slot delay response mode determined from the system time, and determining a given page of the selected buffer;

a stop position selector for receiving the system time signal and a decoding clock, and generating a stop position signal that can be randomly set in one slot;

a flag generator being cleared according to the system time of the receiver, for outputting a flag according to a turbo decoder enable signal of the packet data;

a buffer selector for receiving a signal of the flag generator, an output signal of the stop position selector, and the turbo decoder enable signal, and selecting one of the dualized areas according to a 2-slot delay response mode;

a page selector for selecting a page of the selected area according to the 2-slot delay response mode; and an interrupt controller for generating an interrupt signal by receiving signals from the page buffer selector, the buffer selector and the page selector, and buffer status signals from the dualized area buffer.

24. The mobile station apparatus of claim 23, further comprising:

a baseband interface for receiving a signal from the A/D conversion section and seperating the received signal into a control signal and high-rate packet data; and an input buffer for temporarily storing the high-rate packet data output from the baseband interface before decoding.

25. A method for receiving high-rate packet data, decoding the received packet data and delivering the decoded packet data to an upper layer in a mobile communication system, the method comprising the steps of:

receiving a high-rate radio frequency (RF) encoder packet transmitted from a transmitter of a base station;

converting the received high-rate RF encoder packet into a baseband signal;

analog-to-digital (A/D)) converting the analog baseband signal into a digital signal;

decoding the A/D-converted high-rate encoder packet data and storing the decoded packet data;

generating an interrupt signal and a read address for reading the stored data, when decoding is completad at least two times; and reading the decoded data stored in the read address in response to the interrupt signal;

wherein the step of generating the interrupt signal comprises:

receiving a clear signal and a system synchronization signal, and outputting a first buffer select signal, a first page select signal and a first interrupt signal corresponding to a 1-slot delay response mode based on the received clear signal and the system synchronization signal;

generating a stop position signal that can be randomly set in one slot based on the clear signal, the system synchronization signal and a decoding clock;

outputting an active flag signal of the decoder according to a decoder enable signal of a packet data channel;

generating a second buffer select signal and a second interrupt signal corresponding to a 2-slot delay response mode based on the active flag signal, the stop position signal, the decoder enable signal and the first page select signal;

generating a second page select signal corresponding to the 2-slot delay response mode based one decoding-done signal of the packet data channel, the clear signal and the second interrupt signal;

receiving and outputting status signals of the buffer, and outputting the interrupt signal to a processor based on the 1st interrupt signal, the second interropt signal and the status signals of the buffer, and wherein the buffer read address comprises of at least one of the first buffer select signal and the second buffer select signal, and at least one of the first page select signal and the second page select signal.

* * * * *